United States Patent
Honda et al.

(10) Patent No.: US 8,390,692 B2
(45) Date of Patent: Mar. 5, 2013

(54) IMAGE PICK UP APPARATUS AND IMAGE PICK UP METHOD CAPABLE OF READING SIGNAL CHARGE FOR IMAGE DISPLAY BY NEWLY PERFORMING EXPOSURE WHILE READING SIGNAL CHARGE FOR STILL IMAGE BY SIMULTANEOUS EXPOSURE OF ALL PIXELS

(75) Inventors: Tsutomu Honda, Hachioji (JP); Yuichi Gomi, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 419 days.

(21) Appl. No.: 12/693,679

(22) Filed: Jan. 26, 2010

(65) Prior Publication Data

US 2010/0194958 A1 Aug. 5, 2010

(30) Foreign Application Priority Data

Feb. 3, 2009 (JP) .................................. 2009-023034

(51) Int. Cl.
*H04N 5/235* (2006.01)
(52) U.S. Cl. .................................................... 348/221.1
(58) Field of Classification Search .................. None
See application file for complete search history.

(56) References Cited

U.S. PATENT DOCUMENTS

| 7,312,821 B2 * | 12/2007 | Voss et al. .................. 348/220.1 |
| 2005/0168589 A1 * | 8/2005 | Silverstein et al. ......... 348/220.1 |
| 2006/0051081 A1 * | 3/2006 | Ogino .............................. 396/55 |
| 2008/0309780 A1 * | 12/2008 | Kanamori et al. .......... 348/222.1 |
| 2009/0237541 A1 * | 9/2009 | Johnson et al. ............... 348/308 |

FOREIGN PATENT DOCUMENTS

JP 2005-065184 3/2005

* cited by examiner

*Primary Examiner* — Albert Cutler
(74) *Attorney, Agent, or Firm* — John C. Pokotylo; Straub & Pokotylo

(57) ABSTRACT

The present invention is an image pickup apparatus including a pixel section in which pixels each including a photoelectric conversion section are two-dimensionally arrayed, a transistor that collectively resets the photoelectric conversion sections, an exposure control section that performs control so as to perform exposure for a predetermined time after reset, a signal charge storage section that is light-shielded and stores signal charge generated by the photoelectric conversion sections, a transistor that collectively transfers signal charge from the photoelectric conversion sections to the signal storage section, and a selection transistor that reads still image signal charge for an LV pixel group before signal charge of other pixel groups, then reads signal charge for a live view generated by the LV pixel group one or more times within a time segment during which the still image signal charge of the other pixel groups is read.

7 Claims, 22 Drawing Sheets

IMAGE PICK UP APPARATUS AND IMAGE PICK UP METHOD CAPABLE OF READING SIGNAL CHARGE FOR IMAGE DISPLAY BY NEWLY PERFORMING EXPOSURE WHILE READING SIGNAL CHARGE FOR STILL IMAGE BY SIMULTANEOUS EXPOSURE OF ALL PIXELS

CROSS REFERENCE TO RELATED APPLICATION

This application claims benefit of Japanese Application No. 2009-023034 filed in Japan on Feb. 3, 2009, the contents of which are incorporated by this reference.

BACKGROUND OF THE INVENTION

1. Field of the Invention

The present invention relates to an image pickup apparatus and an image pickup method capable of acquiring image data for still image recording and image data for image display.

2. Description of the Related Art

Image pickup apparatuses such as digital cameras and digital video cameras are mounted with an image pickup device that converts an optical image to an electric signal, and the market share of image pickup devices is shifting from CCD to CMOS in recent years.

A MOS-type image pickup device such as CMOS mounted in an image pickup apparatus is designed to sequentially read charge of many pixels which are two-dimensionally arrayed on an image pickup surface, but an exposure start time and an exposure end time in this condition differ from one pixel to another (from one line to another). Thus, a MOS-type image pickup device configured to be able to equalize exposure start times of all pixels and equalize exposure end times of all pixels (that is, configured to be able to perform control using a global shutter) has a configuration including a photoelectric conversion section such as a photodiode that generates a signal according to an exposure amount, a signal storage section that temporarily stores signal charge generated in the photoelectric conversion section and further a transistor that functions as a switch when transferring or resetting charge.

One example of pixel configuration of such an image pickup device is a configuration shown in FIG. 3 according to an embodiment of the present invention provided with five transistors within one pixel. The configuration shown in FIG. 3 allows control through a global shutter using a signal storage section FD as an in-pixel memory. When this image pickup device is used for a digital camera, for example, Japanese Patent Application Laid-Open Publication No. 2005-65184 describes a technique of driving the image pickup device to suppress KTC noise (reset noise) according to the following sequence.

(1) The signal storage section FD is reset by a transistor Mr and the reset data is read line by line through sequential scanning and stored.

(2) Photoelectric conversion sections PD of all pixels are collectively reset and pixel data of the photoelectric conversion sections PD are collectively transferred to the signal storage section FD after a lapse of a predetermined exposure time.

(3) The pixel data transferred to the signal storage section FD is read line by line through sequential scanning and the reset data stored in (1) is subtracted therefrom (a difference is calculated).

SUMMARY OF THE INVENTION

It is an object of the present invention to provide an image pickup apparatus and an image pickup method capable of shortening, when a still image is picked up, a time during which a live view image is not updated.

In short, the present invention is an image pickup apparatus provided with a pixel section in which pixels each including a photoelectric conversion section for generating signal charge according to an exposure amount are two-dimensionally arrayed, a reset section that collectively resets the photoelectric conversion sections, an exposure control section that controls the photoelectric conversion sections so as to perform exposure for a predetermined time after reset by the reset section, a first charge storage section that is light-shielded that collectively transfers and stores signal charge generated by the photoelectric conversion sections, a first signal charge reading section that reads signal charge of a predetermined pixel group out of the signal charge stored in the first charge storage section before signal charge of other pixel groups and then reads signal charge of the other pixel groups, a first image processing section that creates first image data for still image recording based on the signal charge read by the first signal charge reading section, a second signal charge reading section that reads the signal charge generated by the predetermined pixel group one or more times within a time segment within which the first signal charge reading section reads signal charge of the other pixel groups, and a second image processing section that creates second image data for image display based on the signal charge read by the second signal charge reading section.

Furthermore, the present invention is an image pickup method of collectively resetting photoelectric conversion sections included in two-dimensionally arrayed pixels, then collectively transferring signal charge generated by performing exposure for a predetermined time and storing the signal charge in a storage section and reading the signal charge stored in the storage section, including a step of causing a reset section to collectively reset the photoelectric conversion sections, a step of causing an exposure control section to control the photoelectric conversion sections so as to perform exposure for a predetermined time after reset by the reset section, a step of causing a first charge storage section that is light-shielded to collectively transfer and store the signal charge generated by the photoelectric conversion section, a step of causing a first signal charge reading section to read signal charge of a predetermined pixel group of the signal charge stored in the first charge storage section before signal charge of other pixel groups and then reading signal charge of the other pixel groups, a step of causing a first image processing section to create first image data for still image recording based on the signal charge read by the first signal charge reading section, a step of causing a second signal charge reading section to read signal charge generated by the predetermined pixel group one or more times within a time segment during which the first signal charge reading section reads signal charge of the other pixel groups and a step of causing a second image processing section to create second image data for image display based on the signal charge read by the second signal charge reading section.

The above and other objects, features and advantages of the invention will become more clearly understood from the following description referring to the accompanying drawings.

DETAILED DESCRIPTION OF THE PREFERRED EMBODIMENTS

Hereinafter, embodiments of the present invention will be explained with reference to the accompanying drawings.

Embodiment 1

Figure 1:
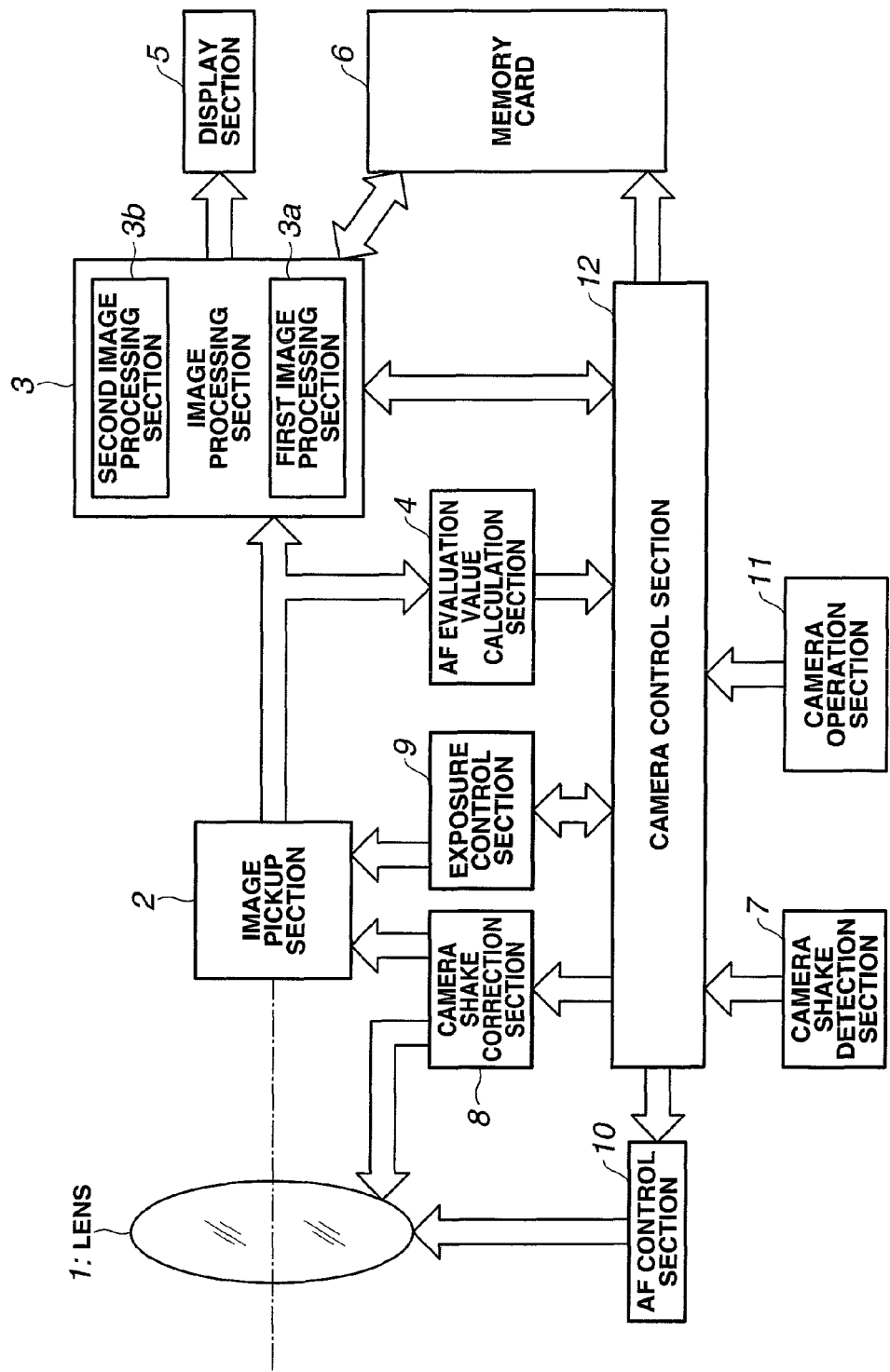
FIG. 1 is a block diagram illustrating a configuration of an image pickup apparatus according to Embodiment 1 of the present invention.

FIG. 1 to FIG. 14 illustrate Embodiment 1 of the present invention, and FIG. 1 is a block diagram illustrating a configuration of an image pickup apparatus.

As shown in FIG. 1, this image pickup apparatus is provided with a lens 1, an image pickup section 2, an image processing section 3, an AF evaluation value calculation section 4, a display section 5, a camera shake detection section 7, a camera shake correction section 8, an exposure control section 9, an AF control section 10, a camera operation section 11 and a camera control section 12. Though a memory card 6 is also described in the figure, the memory card 6 is configured to be detachable from the image pickup apparatus, and so the memory card 6 need not necessarily conform to the configuration specific to the image pickup apparatus.

The lens 1 is a photographing lens to form an optical image of an object on an image pickup plane of an image pickup device 21 (see FIG. 2) of the image pickup section 2.

The image pickup section 2 is intended to photoelectrically convert the optical image of the object formed by the lens 1, convert the optical image to a digital signal as will be described later and then output the digital signal. The image pickup section 2 is configured to at least allow an operation through a global shutter that equalizes exposure start times and exposure end times of all pixels (in addition, may also be configured to allow an operation through a rolling shutter that sequentially performs exposure, for example, line by line (or pixel by pixel)).

The image processing section 3 is intended to apply various types of digital image processing to an image signal outputted from the image pickup section 2. The image processing section 3 is provided with a first image processing section 3a that processes image data for recording and a second image processing section 3b (also serves as a third image processing section) that processes image data for display.

The AF evaluation value calculation section 4 is intended to calculate an AF evaluation value indicating a level of focusing on the object based on the image signal outputted from the image pickup section 2 (e g., luminance signal in the image signal (or luminance equivalent signal) or the like). The AF evaluation value calculated by the AF evaluation value calculation section 4 is outputted to the camera control section 12.

The display section 5 is intended to display an image based on the signal subjected to image processing for a display by the second image processing section 3b of the image processing section 3. The display section 5 is designed to be able to reproduce and display a still image and perform a live view (LV) display that displays an image pickup range in real time.

The memory card 6 is a recording medium for saving a signal subjected to image processing for recording by the first image processing section 3a of the image processing section 3.

The camera shake detection section 7 is intended to detect camera shake of the image pickup apparatus.

The camera shake correction section 8 is intended to drive the lens 1 and the image pickup section 2 based on camera shake information detected by the camera shake detection section 7 so as to cancel out influences of camera shake on an image to be picked up (camera shake correction section).

The exposure control section 9 is intended to drive the image pickup section 2 and perform exposure control based on a command from the camera control section 12.

The AF control section 10 is intended to drive a focus lens included in the lens 1 based on the control of the camera control section 12 that has received the AF evaluation value from the AF evaluation value calculation section 4 so that focus is achieved on the object image formed on the image pickup section 2.

The camera operation section 11 is intended to perform various operations and inputs on the image pickup apparatus. Examples of operation members included in the camera operation section 11 include a power switch for turning ON/OFF the power of the image pickup apparatus, a release button made up of a two-stage push-button for inputting a command of photographing a still image, a photographing mode switch for switching a photographing mode between a single shooting mode and a continuous shooting mode and an AF mode switch for switching an AF mode between a single AF mode and a continuous AF mode or the like.

The camera control section 12 is intended to control the entire image pickup apparatus including the image processing section 3, the memory card 6, the camera shake correction section 8, the exposure control section 9, the AF control section 10 or the like based on the AF evaluation value from the AF evaluation value calculation section 4, camera shake information from the camera shake detection section 7 and operations and inputs from the camera operation section 11.

Figure 2:
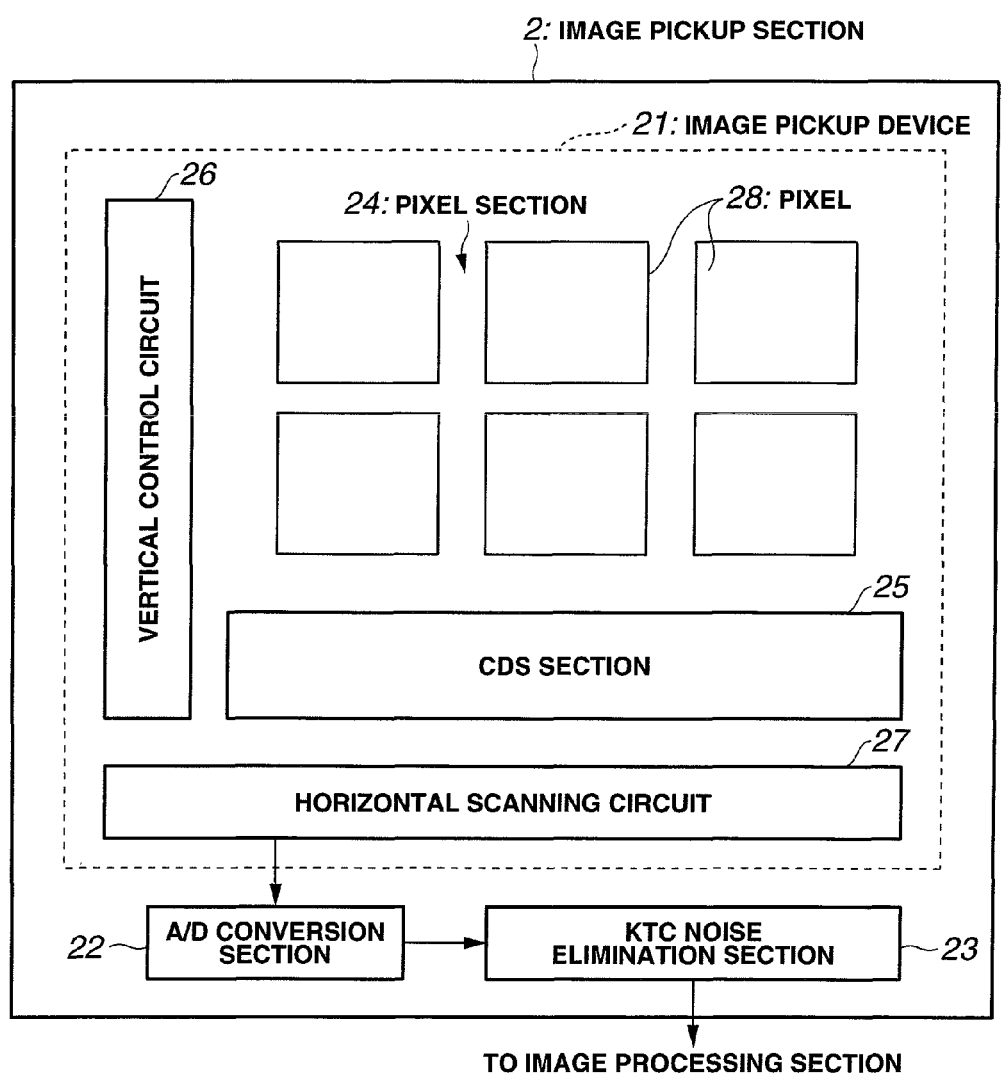
FIG. 2 is a diagram illustrating a more detailed configuration of an image pickup section according to Embodiment 1 of the present invention.

Next, FIG. 2 is a diagram illustrating a more detailed configuration of the image pickup section 2.

The image pickup section 2 is provided with the image pickup device 21 configured, for example, as a MOS-type solid image pickup device, an A/D conversion section 22 and a KTC noise elimination section 23

The image pickup device 21 among these components is configured by including a pixel section 24, a CDS section 25, a vertical control circuit 26 and a horizontal scanning circuit 27.

The pixel section 24 is configured by arraying a plurality of pixels 28 two-dimensionally in a row direction and a column direction.

The vertical control circuit 26 is intended to apply various signals to the pixels arrayed in the pixel section 24 in row (line) units and intended to also serve as a vertical scanning circuit, a reset control section and a signal reading control section. A signal from a pixel on a row selected by the vertical control circuit 26 is outputted to a vertical transfer line VTL (see FIG. 3) provided for each column.

The CDS section 25 is intended to perform correlation double sampling on a pixel signal transferred from the vertical transfer line VTL when the image pickup section 2 operates through a rolling shutter.

The horizontal scanning circuit 27 is intended to capture pixel signals corresponding to one row selected by the vertical control circuit 26, transferred from the vertical transfer line VTL subjected or not subjected to CDS via the CDS section 25 and output the pixel signals on the row in a pixel sequence in the horizontal direction in chronological order.

The A/D conversion section 22 is intended to convert an analog image signal outputted from the image pickup device 21 to a digital image signal.

The KTC noise elimination section 23 is intended to perform processing of KTC noise elimination on the digital image signal outputted from the A/D conversion section 22 when the image pickup section 2 is operated through the global shutter.

Figure 3:
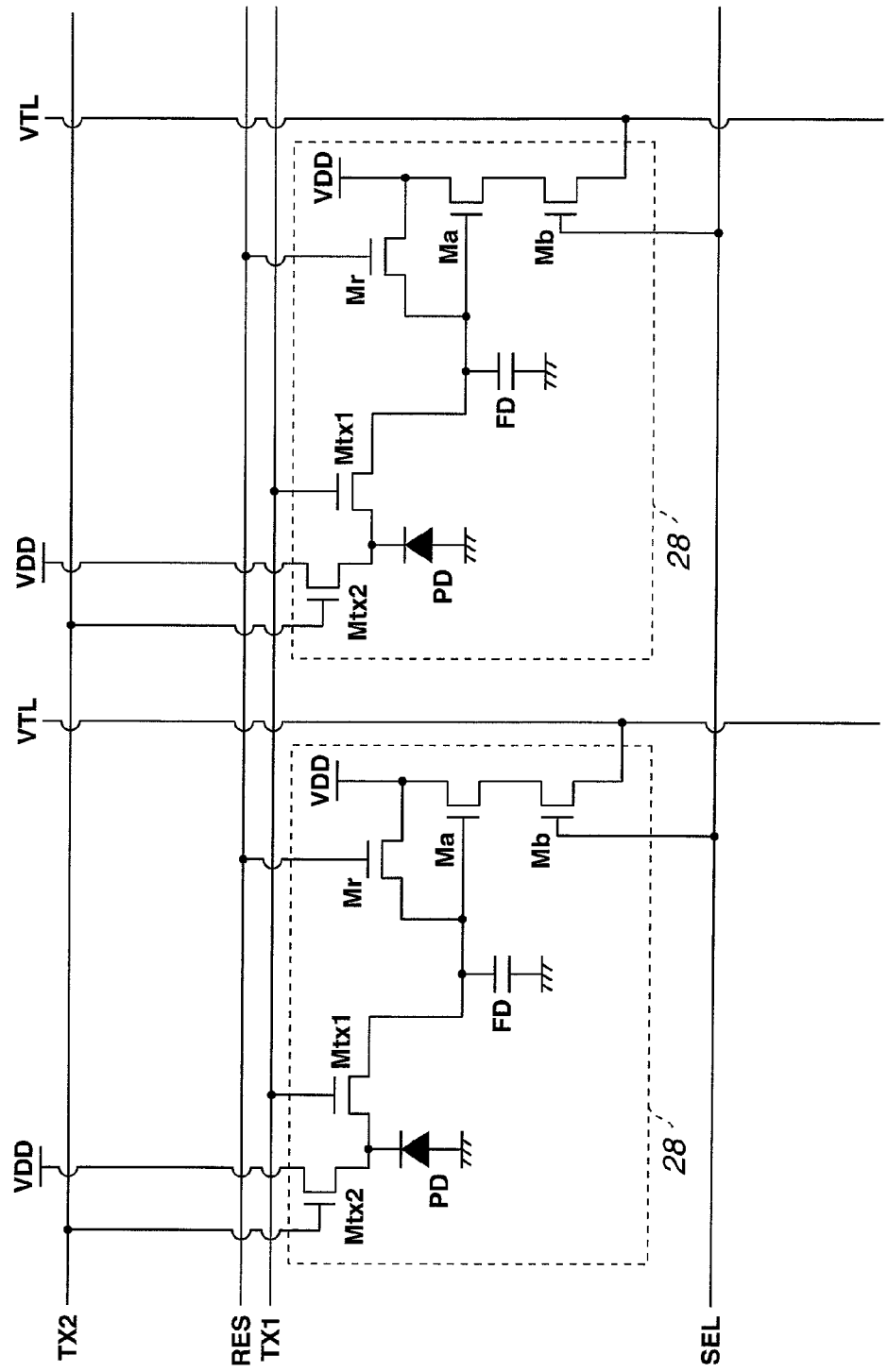
FIG. 3 is a circuit diagram illustrating a more detailed example of pixel configuration of a pixel section of an image pickup device according to Embodiment 1 of the present invention.

Next, FIG. 3 is a circuit diagram illustrating a more detailed configuration example of the pixel 28 in the pixel section 24 of the image pickup device 21.

In FIG. 3, reference character PD (photodiode) denotes a photoelectric conversion section and FD (floating diffusion) denotes a signal storage section (storage section, first charge storage section) that temporarily stores a signal of the photoelectric conversion section PD.

Reference character Mtx2 denotes a transistor that functions as a first reset section to reset the photoelectric conversion section PD, is connected to a current source VDD and also connected to a signal line TX2 to apply a PD reset pulse.

Reference character Mtx1 denotes a transistor that functions as a transfer section or a gate section to transfer the signal of the photoelectric conversion section PD to the signal storage section FD and is connected to a signal line TX1 to apply a transfer pulse.

Reference character Ma denotes an amplification transistor that functions as an amplification section and constitutes a source-follower amplifier together with the current source VDD. A signal of the signal storage section FD is amplified by the amplification transistor Ma and outputted to the vertical transfer line VTL via a selection transistor Mb that functions as a signal charge reading section (first signal charge reading section, second signal charge reading section, reset signal reading section, third signal charge reading section). The selection transistor Mb is connected to a signal line SEL to apply a selection pulse.

Reference character Mr denotes a transistor that functions as a second reset section that resets the input sections of the signal storage section FD and the amplification transistor Ma and is connected to a signal line RES to apply an FD reset pulse. If application of a transfer pulse to the aforementioned transistor Mtx1 and application of an FD reset pulse to this transistor Mr are performed simultaneously, it is possible to not only reset the signal storage section FD but also reset the photoelectric conversion section PD. Therefore, the combination of the transistor Mtx1 and the transistor Mr also functions as the first reset section for the photoelectric conversion section PD.

Figure 4:
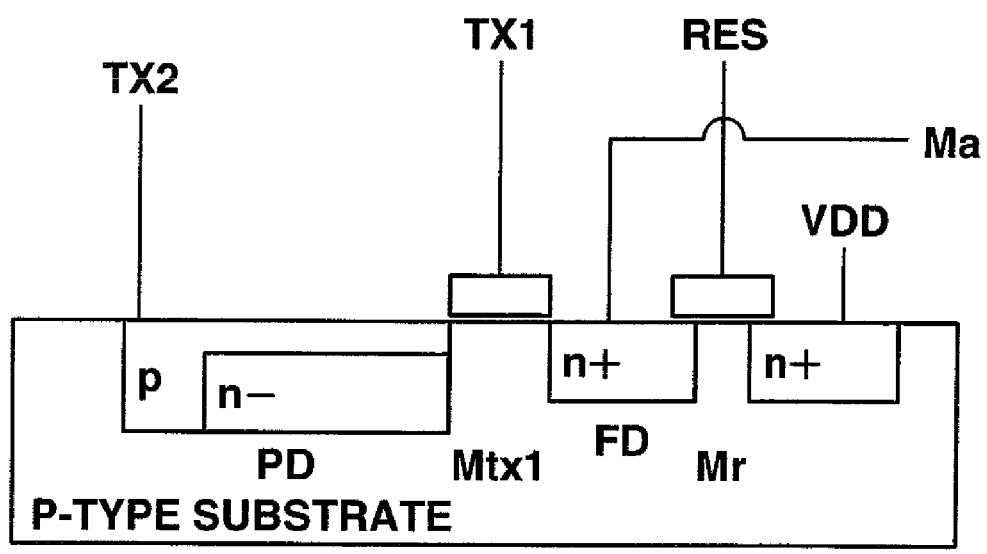
FIG. 4 is a diagram illustrating a pixel configuration in a semiconductor substrate in a thickness direction of the substrate according to Embodiment 1 of the present invention.

Next, FIG. 4 is a diagram illustrating a configuration of the pixel 28 on the semiconductor substrate in the thickness direction of the substrate.

A P-type substrate is used as the semiconductor substrate in the example shown in FIG. 4.

The photoelectric conversion section PD is formed as an n-region and a p-region is formed on the wiring layer side thereof. Furthermore, a signal line TX2 is connected to this p-region. This allows the photoelectric conversion section PD to be formed as an embedded type and allows a dark current to be reduced. Furthermore, the substrate surface other than the part corresponding to the photoelectric conversion section PD is light-shielded by a light-shielding film provided with predetermined light-shielding performance.

The signal storage section FD is formed as an n+ region at a predetermined distance from the photoelectric conversion section PD. This n+ region is connected to the amplification transistor Ma. Thus, since the signal storage section FD is directly connected to the wiring layer, it is difficult to reduce the dark current.

Furthermore, a gate electrode is formed on the substrate surface between the photoelectric conversion section PD and the signal storage section FD and the transistor Mtx1 is configured. The gate electrode of this transistor Mtx1 is connected to the signal line TX1.

Furthermore, another n+ region is formed at a position at a predetermined distance from the n+ region making up the signal storage section FD and the current source VDD is connected to the latter n+ region. The gate electrode is then formed on the substrate surface between the two n+ regions and the transistor Mr is constructed. The gate electrode of the transistor Mr is connected to the signal line RES.

Figure 5:
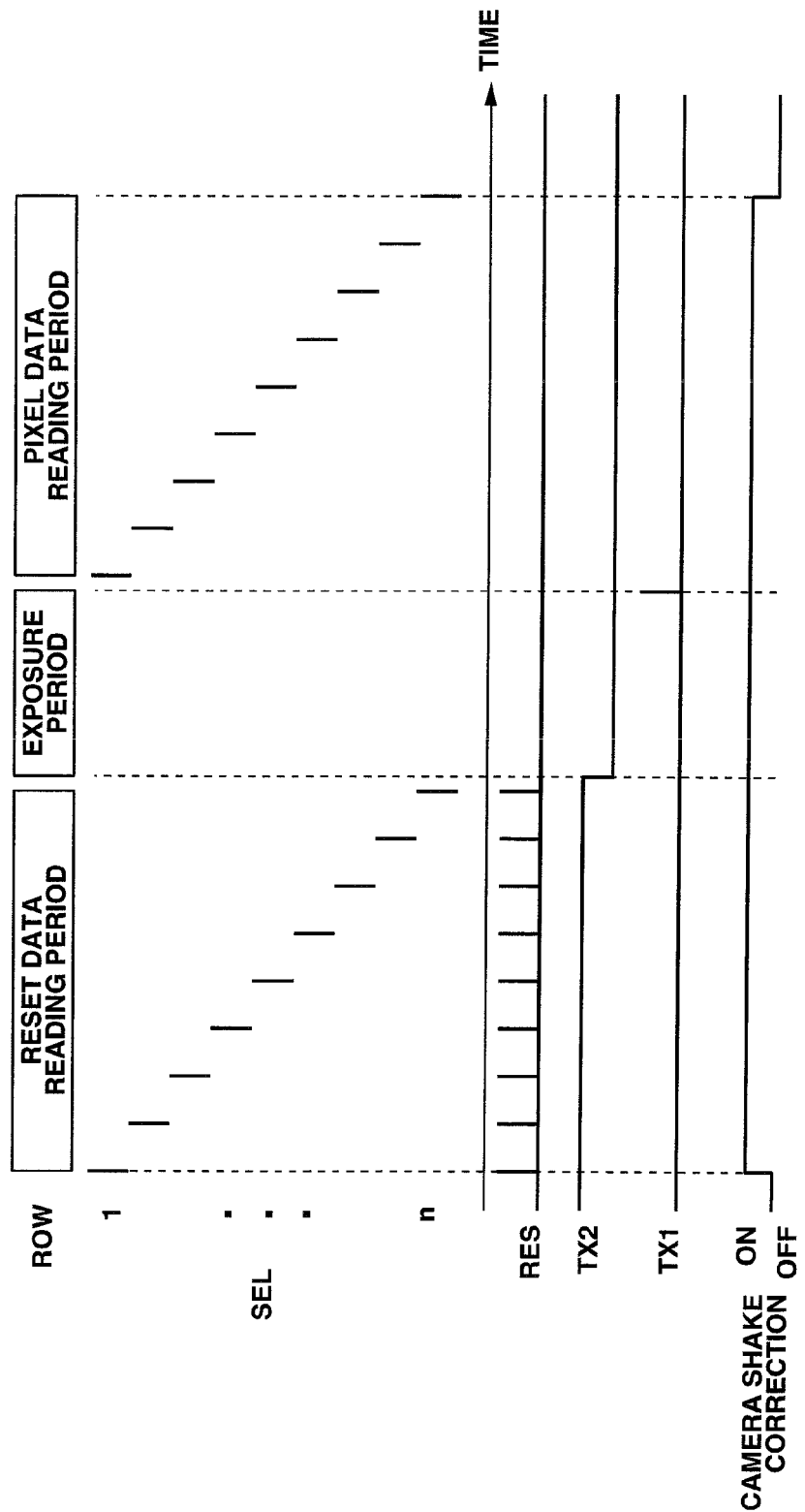
FIG. 5 is a timing chart illustrating a global shutter operation of the image pickup apparatus according to Embodiment 1 of the present invention.

Next, FIG. 5 is a timing chart illustrating a global shutter operation of the image pickup apparatus.

Before performing exposure through the global shutter operation, the signal storage section FD is reset and reset noise is read for a reset data reading period first. That is, the signal storage section FD on the first row is reset by applying a reset pulse to the transistor Mr of each pixel 28 arrayed on the first row of the pixel section 24 from the signal line RES. Furthermore, reset noise is read from the signal storage section FD on the first row by applying a selection pulse to the selection transistor Mb of each pixel 28 arrayed on the first row of the pixel section 24 from the signal line SEL.

By sequentially performing such an operation from the first row to the nth row (final row) of the pixel section 24, reset noise of all pixels is read. The reset noise read here is stored in the KTC noise elimination section 23 via the CDS section 25 (without CDS operation), the horizontal scanning circuit 27 and the A/D conversion section 22 in that order.

Next, during this global shutter operation, by simultaneously turning OFF the transistors Mtx2 of all pixels on all lines via the signal line TX2, storage of charge in the photoelectric conversion sections PD of all pixels is started, that is, exposures of all pixels are started simultaneously.

When a predetermined exposure period (this exposure period corresponds to the shutter speed determined by an AE calculation) has elapsed after exposures are started, a transfer pulse is simultaneously applied to the transistors Mtx1 of all pixels on all lines via the signal line TX1 and the charge stored in the photoelectric conversion sections PD is thereby transferred to the signal storage sections FD, that is, exposures of all pixels are simultaneously finished.

After that, a pixel data reading period starts, and the charge stored in the signal storage sections FD is sequentially transferred line by line from the first row toward the nth row (final row) to the vertical transfer line VTL via the amplification transistor Ma and the selection transistor Mb.

At least from the start of the reset data reading period (reset start by the transistor Mr which is the second reset section) to the end of the pixel data reading period, camera shake is corrected by the camera shake correction section 8 based on the detection result of the camera shake detection section 7. Such a camera shake correction is made to prevent, when a high luminance object is located within the field to be photographed, expansion of the range of influences of leakage light or leakage current from the high luminance portion at the position at which an image of the high luminance object is formed.

That is, a normal high luminance object is considered to have a BV value on the order of 12 to 13 as an upper limit and the light-shielding performance of the light-shielding film of the image pickup device 21 is also designed to be able to shield light from the high luminance object at such a level. On the contrary, when the object is the sun, for example, the BV value may reach as high as 27 and the object can be said to be a high luminance object exceeding a normally conceivable range. In such a case, a certain amount of leakage light or leakage current should be assumed to be generated even in the signal storage section FD which is light-shielded by a light-shielding film, but if camera shake occurs in the reset data reading period or pixel data reading period, the influences of the leakage light or leakage current may expand over a wide range.

Thus, as shown in FIG. 5, a camera shake correction is performed by the camera shake correction section 8 based on the detection result of the camera shake detection section 7 from at least the start of the reset data reading period (reset start by the second reset section) to the end of the pixel data reading period. This makes it possible to suppress expansion of the influences of leakage light or leakage current and prevent image quality from further deteriorating.

Figure 6:
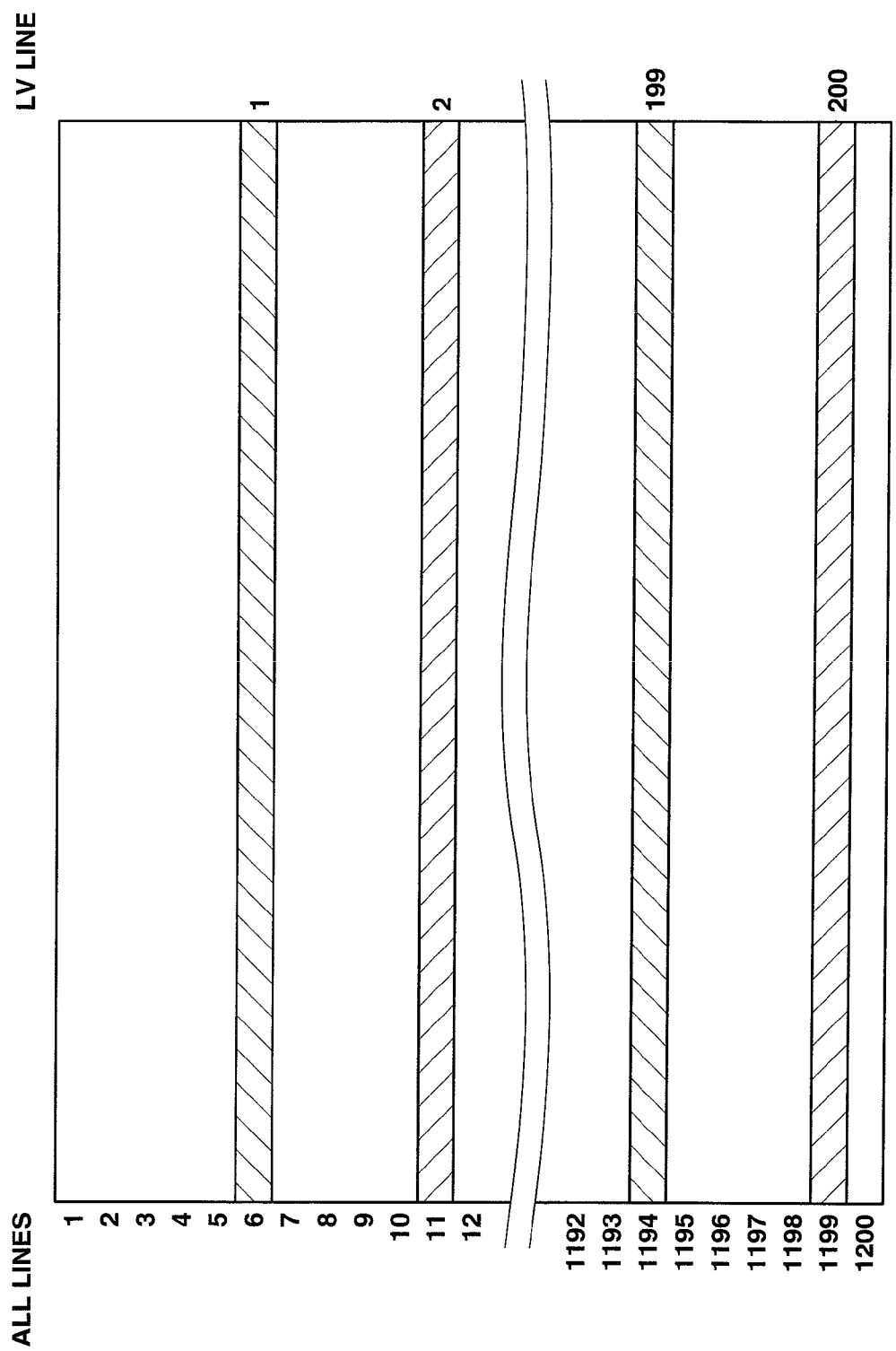
FIG. 6 is a diagram illustrating an example of lines read to be used for a live view by the pixel section according to Embodiment 1 of the present invention.

Next, FIG. 6 is a diagram illustrating examples of lines read to be used for a live view in the pixel section 24.

In the example shown in FIG. 6, the total number of lines configured in the pixel section 24 is 1200. An example where pixel data for a live view (LV) is read at a rate of one out of every six lines among all lines is shown here. However, when the image pickup device 21 is a single color image pickup device, a color filter of Bayer arrangement, for example, is disposed on the front of the pixel section 24, and if only lines corresponding to multiples of 6 are simply read, color components obtained are only G and R or only G and B, and therefore by reading (12m−6) lines (m is an integer of 1 to 100) of all lines as even-numbered lines for LV and reading (12m−1) lines (m is an integer of 1 to 100) of all lines as odd-numbered lines for LV, all color components of RGB can be obtained.

Figure 7:
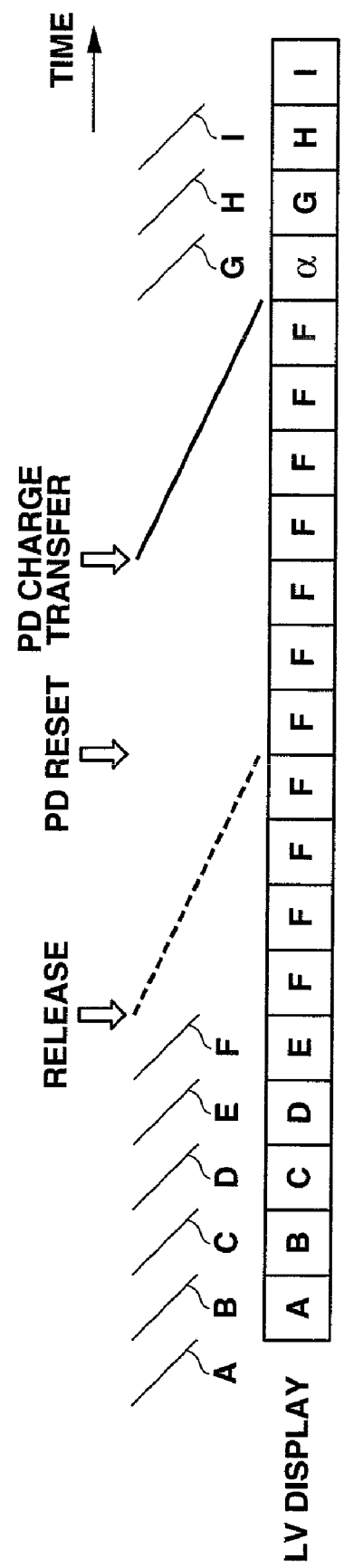
FIG. 7 is a diagram illustrating an example where the image pickup section is driven to pick up a still image using a first drive method in the middle of performing a live view according to Embodiment 1 of the present invention.

Next, FIG. 7 is a diagram illustrating an example when the image pickup section 2 is driven to pick up a still image using a first drive method in the middle of performing a live view.

As illustrated in FIG. 6, reading all the pixel data of all 1200 lines requires a time of 60 ms, for example, but it is possible to selectively read pixel data of 200 lines for LV in, for example, approximately 17 ms (or more exactly 16.67 ms) (also see FIG. 10 which will be described later). In the former case, 16 still images per second can be read at most, whereas image data of 60 frames per second can be acquired in the latter case.

Therefore, while a live view is being performed, image data is acquired at a rate of for example, 60 frames per second until the release button is pressed (here two-stage pressing) and displayed on the display section 5. In this case, when image data is acquired in a certain frame as illustrated, image data acquired in the next frame is displayed as a live view.

If the release button is pressed in the middle of performing this live view, in such a case as shown in FIG. 7, that is, the image pickup section 2 is driven to pick up a still image using the first drive method, the capturing of image data for a live view is stopped and the image pickup operation shown in FIG. 5 is performed. Since the image data for a live view is not captured in the middle of this image pickup operation, the processing of continuing to display the last captured image data F for a live view as shown in FIG. 7 is performed. Instead of continuing to display the last captured image data F for a live view, live view display may be prevented from being performed during the image pickup operation.

When the image pickup operation of the still image as shown in FIG. 5 is finished, the image data for a live view is acquired again and image data acquired in the next frame is displayed as a live view. In the example shown in FIG. 7, in order to shorten, even by one frame, the period during which no live view is performed, image data a for a live view is created from the image data acquired for a still image in the next frame in which the image pickup operation of a still image shown by a solid bold line ends and a live view display is performed.

Figure 8:
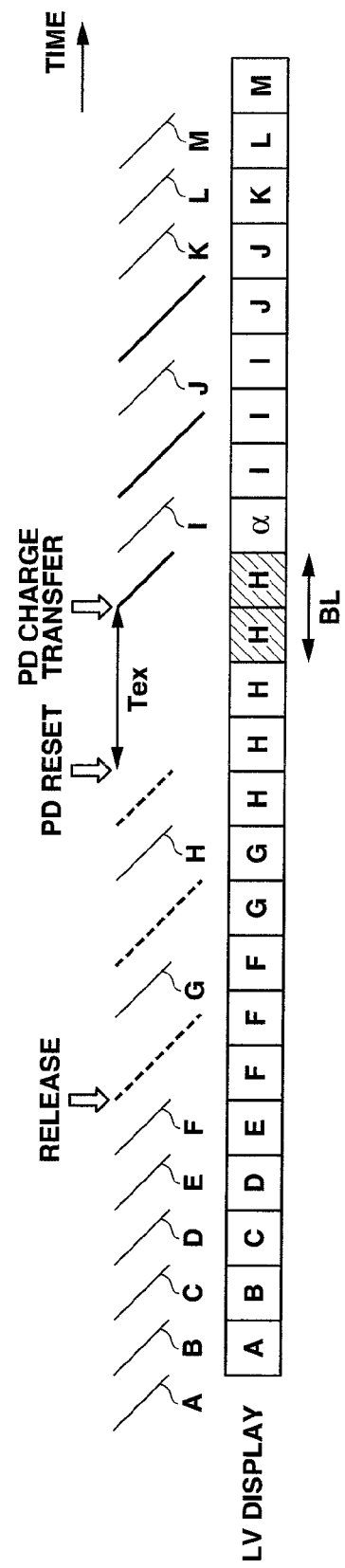
FIG. 8 is a diagram illustrating an example where the image pickup section is driven to pick up a still image using a second drive method in the middle of performing a live view according to Embodiment 1 of the present invention.

Next, FIG. 8 is a diagram illustrating an example where the image pickup section 2 is driven to pick up a still image using a second drive method in the middle of performing a live view.

When the image pickup section 2 is driven using the first drive method shown in FIG. 7, no live view image is acquired after the release button is pressed until the image pickup operation is finished, and therefore the display is not updated. On the other hand, when the image pickup section 2 is driven using the second drive method shown in FIG. 8, a live view image is acquired also after the release button is pressed until the image pickup operation is finished and the live view display is updated.

The operation shown in FIG. 8 is the same operation as that shown in FIG. 7 until the release button is pressed.

When the release button is pressed, reading of reset data is started, but when reading of several lines of reset data is performed, an operation of acquiring live view images from lines from which reset data has not been read yet is performed. By the time the reading of the reset data is completed, a live view image is acquired one or more times so that the reset data of each line used to acquire a live view image is acquired at the end of the reset data reading period. Furthermore, when live view images are acquired two or more times, reset data is read after acquisition of each live view image. A live view image acquired during the reset data reading period in this way has a lower frame rate of the image acquired than a normal live view image, and therefore the same live view image is displayed continuously over a plurality of display frames and the display is updated when acquisition of a new live view image is completed.

The exposure period is then started by resetting the photoelectric conversion section PD and the exposure period ends when charge of the photoelectric conversion section PD has been transferred to the signal storage section FD just as the operation shown in FIG. 7.

The pixel data reading period is then started, and in this case, pixel data of each line to be used to acquire a live view image is read first and then pixel data of other lines is read. A live view image is acquired one or more times at an appropriate time after reading of pixel data of each line is completed (appropriate time within the pixel data reading period). In this case, when live view images are acquired two or more times, pixel data is read after acquisition of each live view image.

In the example shown in FIG. 8 as with the example shown in FIG. 7, in order to shorten the period, even by one frame, during which no live view is performed, image data α for a live view is created from the image data acquired for a still image in a frame next to a frame in which acquisition of the pixel data for a still image of each line to be used to acquire a live view image is completed and a live view is then displayed.

When the pixel data reading period is finished, the process is returned to a normal live view as with the example shown in FIG. 7

Figure 9:
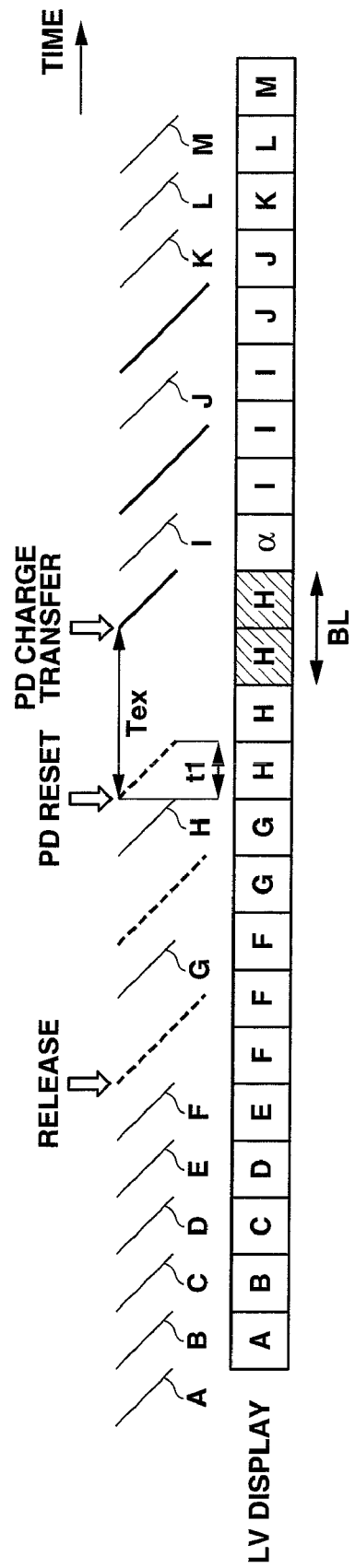
FIG. 9 is a diagram illustrating another example where the image pickup section is driven to pick up a still image using the second drive method in the middle of performing a live view according to Embodiment 1 of the present invention.

Next, FIG. 9 is a diagram illustrating another example where the image pickup section 2 is driven to pick up a still image using the second drive method in the middle of performing a live view.

The example shown in FIG. 9 is devised so as to further shorten the period during which no live view image is acquired compared to the example shown in FIG. 8.

That is, in the example shown in FIG. 8, the photoelectric conversion section PD is reset and exposure is started after reading of reset data on all lines is completed. On the other hand, in the example shown in FIG. 9, immediately after the last live view image in the reset data read period is acquired, the photoelectric conversion section PD is reset and reading of the remaining reset data is continued even after the exposure period is started. As is obvious with reference to the pixel configuration shown in FIG. 3, once the transistor Mtx1 is turned OFF, reading of reset data from the signal storage section FD via the amplification transistor Ma and the selection transistor Mb never influences the storage of pixel charge in the photoelectric conversion section PD started by turning OFF the transistor Mtx2. Therefore, exposure and reading of reset data can be performed simultaneously in this way.

By performing such processing, the period during which no live view image is acquired can be shortened by time t1 compared to the example shown in FIG. 8. Furthermore, by performing such processing, the time required after reading reset data until the pixel data is read can also be shortened by time t1 compared to the example shown in FIG. 8. As shown in FIG. 4, the signal storage section FD is directly connected to the wiring layer and it is difficult to reduce a dark current. Therefore, shortening the time required after reading the reset data until the pixel data is read leads to a reduction of the amount of dark current generated and also has an advantage that it is possible to reduce the influence of the reset data on the pixel data.

Figure 10:
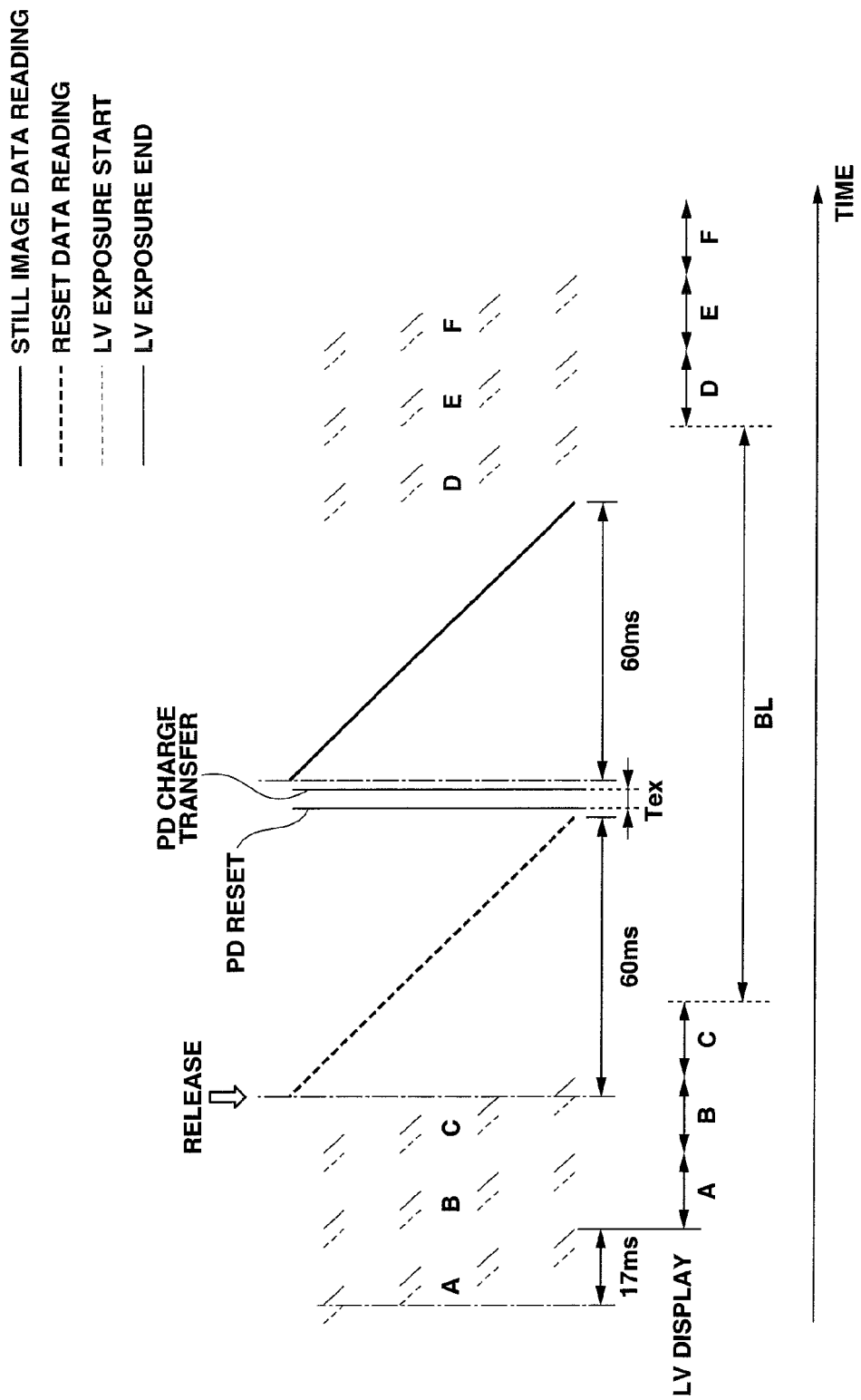
FIG. 10 is a timing chart illustrating the processing shown in FIG. 7 of Embodiment 1 of the present invention in further detail.

Next, FIG. 10 is a timing chart illustrating the processing shown in FIG. 7 in further detail.

As described in FIG. 7, this FIG. 10 also illustrates processing when the image pickup section 2 is driven to pick up a still image using the first drive method in the middle of performing a live view.

In the live view display period before the release button is turned ON, an exposure start for LV and an exposure end for LV are performed for each display frame on the lines for LV as shown in FIG. 6, for example, and displayed in the next display frame.

When the release button is pressed, reset data is read, but since reading of still image reset data is performed on all lines of the pixel section 24 (all 1200 lines in the example shown in FIG. 6), the time required to read the reset data is, for example, 60 ms as described above. A period BL starts after performing an LV display of the last acquired LV image data (image data C in the illustrated example) before the reset data reading period starts. The period BL is a period during which no LV display is performed (blackout) or the image data C is LV-displayed continuously without any image update.

After that, acquisition of LV image data is started after a lapse of an exposure period (shutter speed Tex) and a pixel data reading period (for example, 60 ms as with the reset data reading period) and an LV display is performed in the next display frame after the acquisition. In the example shown in FIG. 10, it is the image data D that is the LV display updated first after the still image is acquired, but as in the case of the explanation with reference to FIG. 7, image data α0 for LV may be created based on the acquired image data for the still image and may be LV-displayed before the image data D.

Figure 11:
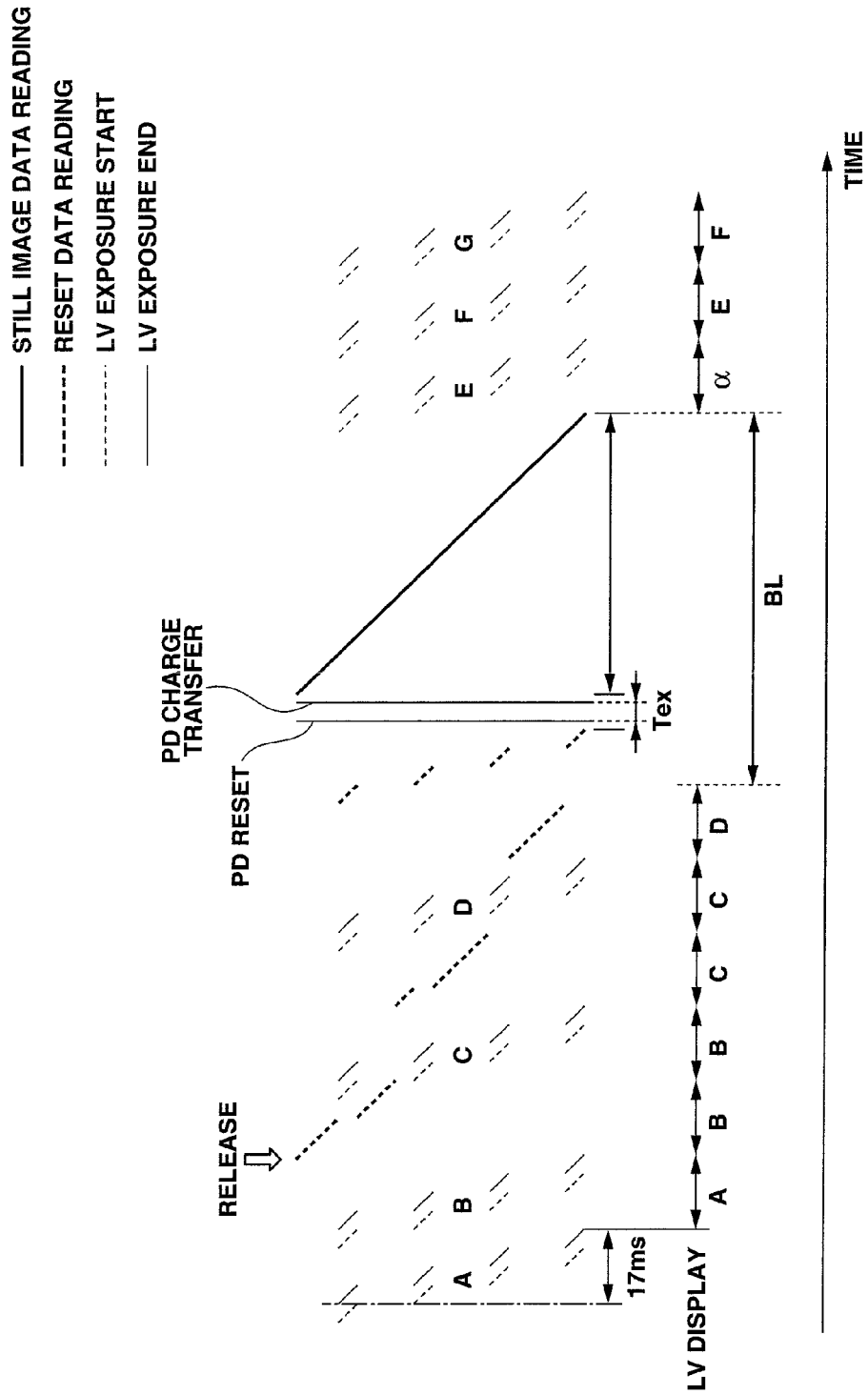
FIG. 11 is a timing chart illustrating an example of processing of acquiring LV image data only during a reset data reading period of the processing shown in FIG. 8 of Embodiment 1 of the present invention.

Next, FIG. 11 is a timing chart illustrating an example of processing where LV image data is acquired only for the reset data reading period of the processing shown in FIG. 8. That is, in the example shown in FIG. 11, unlike the example shown in FIG. 8, no LV image data is acquired during the pixel data reading period.

In the example shown in FIG. 11, reset data is read and LV image data is acquired after the release button is pressed based on the following principles.

First, as described above, reset data of each line used to acquire a live view image (hereinafter referred to as "LV line" and lines other than the LV line of all lines will be hereinafter referred to as "non-LV lines") is acquired at the end of the reset data reading period.

The LV image data is acquired at a rate of once every plurality of display frames (in the example shown in FIG. 11, LV image data C and D are acquired at a rate of once every two display frames. In this case, the last LV image data B acquired before the release button is pressed is LV-displayed twice repeatedly, and the image data C is also LV-displayed twice repeatedly likewise. Furthermore, the last LV image data D acquired before resetting of the photoelectric conversion section PD is LV-displayed only once in the example shown in FIG. 11, but as described above, may also be repeatedly displayed for the period BL). The LV image data need not necessarily be acquired in synchronization with the display frame.

Reset data of non-LV lines are read in ascending order of line numbers for a period during which no LV image data is acquired (in the example shown in FIG. 11, the period after the release button is pressed until reading of the LV image data C is started, period after reading of the LV image data C is finished until reading of the LV image data D is started and, period after reading of the LV image data D is finished).

After that, as described above, the reset data for LV lines is read at the end of the reset data reading period.

Next, after an exposure period and a pixel data reading period, a live view is started again, but in the example shown in FIG. 11, a live view is performed with the same LV line as that before the release button is pressed.

Furthermore, in the example shown in FIG. 11, image data α for a live view is created from the image data acquired for a still image in a display frame next to the one in which an image pickup operation of a still image is finished so as to shorten, even by one frame, the period during which no live view is performed.

Figure 12:
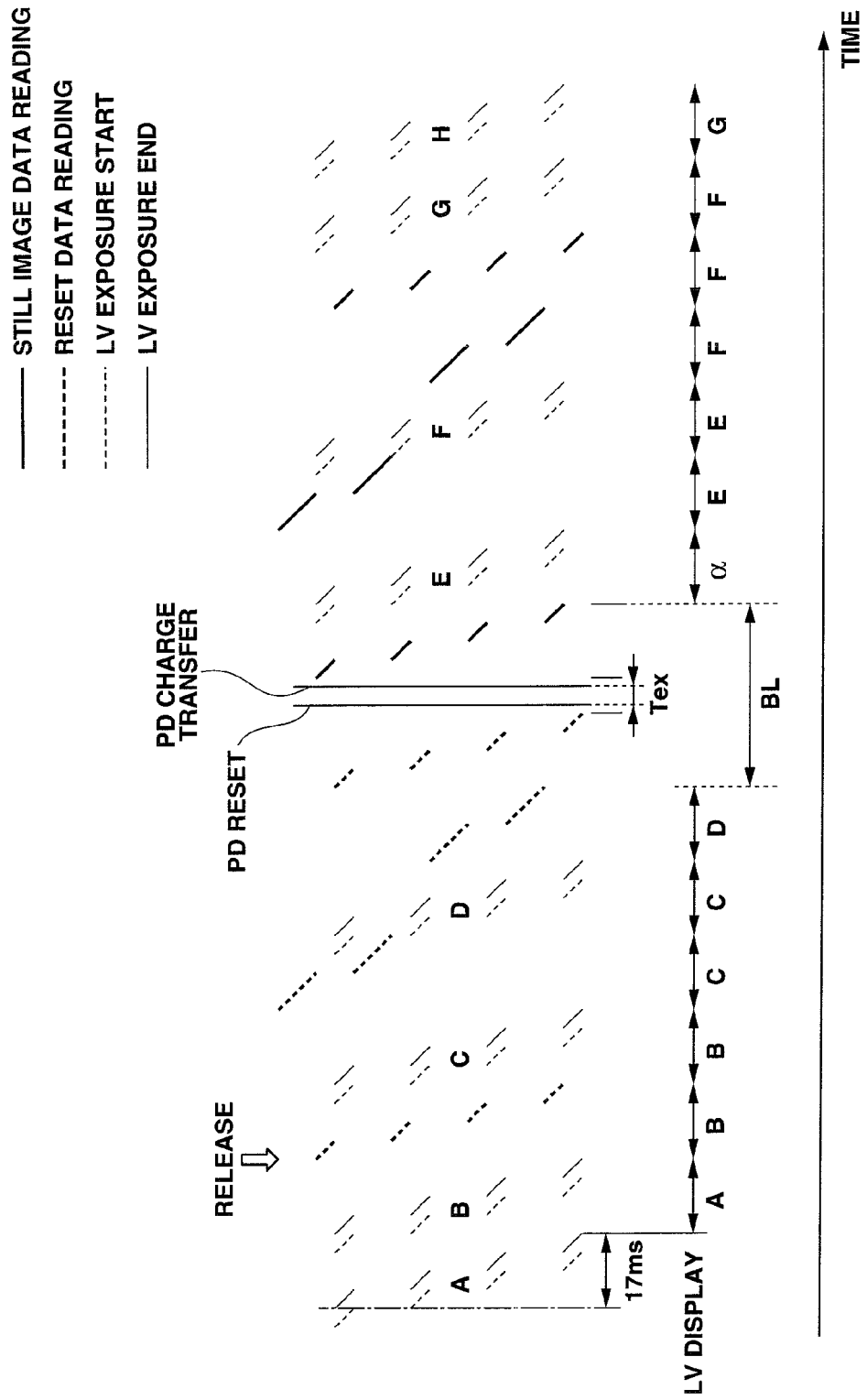
FIG. 12 is a timing chart illustrating a more detailed example of the processing shown in FIG. 8 of Embodiment 1 of the present invention.

Next, FIG. 12 is a timing chart illustrating a more detailed example of the processing shown in FIG. 8. In the example shown in FIG. 12 unlike the example shown in FIG. 11, LV image data is acquired for both the reset data reading period and the pixel data reading period.

Furthermore, in the example shown in FIG. 12, the LV line on which LV image data is acquired before the exposure period is made to differ from the LV line on which LV image data is acquired after the exposure period (made to differ particularly so as not to overlap with each other).

In the example shown in FIG. 12, reset data after the release button is pressed is read and LV image data is acquired based on the following principles.

First, the reset data of LV lines after the exposure period is read at the beginning of the reset data reading period (period after the release button is pressed until reading of LV image data C is started in the example shown in FIG. 12).

Furthermore, LV image data is acquired at a rate of once every plurality of display frames. As described above, LV image data need not necessarily be acquired in synchronization with the display frame.

For the period during which no LV image data is acquired (period after reading of the LV image data C is finished until reading of LV image data D is started and period after reading of LV image data D is finished in the example shown in FIG. 12), reset data of non-LV lines (a line not corresponding to any one of the LV line before the exposure period and the LV line after the exposure period will be referred to as a non-LV line in the explanations in FIG. 12) are read in ascending order of line numbers, for example.

After that, reset data of LV lines before the exposure period is read at the end of the reset data reading period (period after reading of the LV image data D is finished and after reset data of non-LV lines is completed in the example shown in FIG. 12).

Next, after the exposure period, a pixel data reading period starts. Pixel data on the LV lines after the exposure period is read first (period after the exposure period ends until reading of LV image data E is started in the example shown in FIG. 12). After this reading is completed, LV image data from the LV lines after the exposure period can be read even within a pixel data reading period.

In the example shown in FIG. 12, image data α for a live view is created based on pixel data read for a still image from the LV lines after the exposure period and a live view is displayed in the immediately following display frame.

After that, LV image data is acquired at a rate of once every plurality of display frames (LV image data need not be acquired in synchronization with the display frame as described above).

Next, for a period during which no LV image data is acquired (period after reading of LV image data E is finished until reading of LV image data F is started and period after reading of LV image data F is finished in the example shown in FIG. 12), reset data of non-LV lines are read in ascending order of line numbers, for example.

Furthermore, at the end of the pixel data reading period (period after reading of LV image data F is finished and after reading of reset data of non-LV lines is completed in the example shown in FIG. 12), pixel data of LV lines before the exposure period are read.

Since this completes image pickup of the still image, a normal live view is displayed thereafter.

In the example shown in FIG. 12, the time after reading reset data until the time of reading pixel data is basically (though some exceptions may occur depending on timing) set to be the same for each line. This allows the amount of noise caused by a dark current to be the same for any line (excluding some exceptions as described above). Therefore, it is possible to prevent deterioration of image quality resulting from differences in the amount of noise among lines.

In FIG. 12, LV image data is read for both the reset data reading period and the pixel data reading period, and in FIG. 11, LV image data is read for only one of the two periods, the reset data reading period, and further it is naturally possible to read LV image data only for the other, the pixel data reading period. That is, LV image data can be read within at least only one of the reset data reading period and the pixel data reading period.

Furthermore, when the processing shown in FIG. 12 is performed, the image displayed in a live view is shifted by a few lines in the horizontal direction before and after the exposure period, but when the image pickup apparatus is a digital camera or the like, since the screen size of the display section 5 is smaller than the display section of a personal computer or the like, this shift is not very noticeable when displayed and there is substantially no problem from a practical standpoint.

Figure 13:
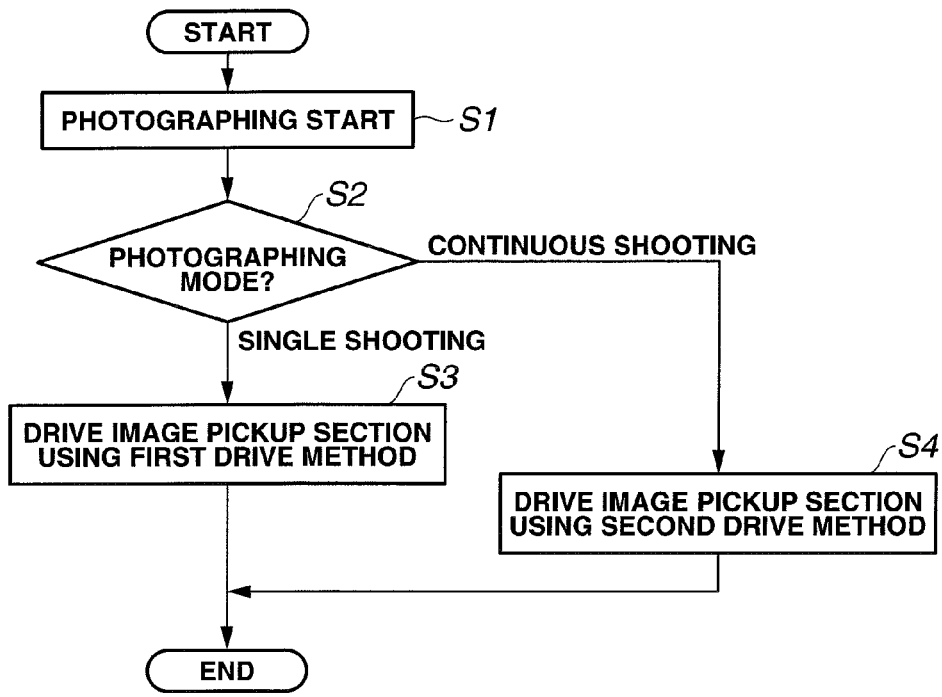
FIG. 13 is a flowchart illustrating processing according to a photographing mode of the image pickup apparatus according to Embodiment 1 of the present invention.

Next, FIG. 13 is a flowchart illustrating processing according to a photographing mode of the image pickup apparatus.

When this processing starts upon pressing of the release button of the camera operation section 11, for example, the image pickup apparatus starts a photographing operation (step S1).

Next, the camera control section 12 determines whether the setting of the photographing mode is a single shooting mode or a continuous shooting mode (step S2).

When the mode is determined to be the single shooting mode here, the image pickup section 2 is driven to photograph a still image using the first drive method (see FIG. 5, FIG. 7, FIG. 10 or the like) (step S3) and this process is finished.

On the other hand, when the photographing mode is determined to be the continuous shooting mode in step S2, the image pickup section 2 is driven to photograph a still image using the second drive method (see FIG. 8, FIG. 9, FIG. 11, FIG. 12 or the like) (step S4) and this process is finished.

In the continuous shooting mode, even if photographing of one image is finished, it is preferable that data for AF or data for AE can be acquired to photograph the next image and that the photographer can check the object. Image data for LV is used not only for a live view display on the display section 5 but also as data for AF and data for AE, and therefore the image pickup section 2 is made to be driven using the second drive method in the continuous shootings. This makes it possible to shorten the time during which LV images are not updated when continuous shooting photographing is performed or a blackout time, and makes it easier, even when the object is a moving object, for the photographer to change the photographing direction of the image pickup apparatus so as to capture the object within the photographing range. Moreover, each image photographed by continuous shootings can be an image focused with higher accuracy based on AF tracking or an image with a more appropriate exposure based on AE tracking. On the other hand, in the single shooting mode, since performing a normal AF operation or AE operation is sufficient, the image pickup section 2 is driven using the first drive method so as to shorten the time after the release button is pressed until recording to the memory card 6 is finished.

Figure 14:
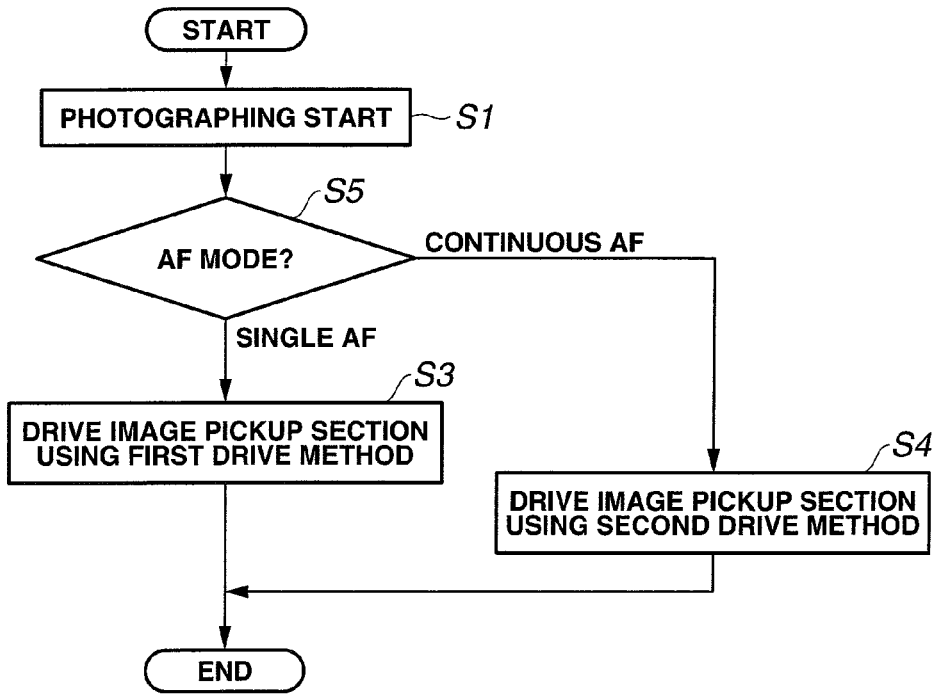
FIG. 14 is a flowchart illustrating processing according to an AF mode of the image pickup apparatus according to Embodiment 1 of the present invention.

Next, FIG. 14 is a flowchart illustrating processing according to an AF mode of the image pickup apparatus.

When, for example, this processing is started when the release button of the camera operation section 11 is pressed, the image pickup apparatus starts a photographing operation first (step S1).

Next, the camera control section 12 determines whether the setting of the AF mode is a single AF mode or a continuous AF mode (step S5).

When the AF mode is determined to be the single AF mode here, the image pickup section 2 is driven to photograph a still image using the first drive method (see FIG. 5, FIG. 7, FIG. 10 or the like) (step S3) and this process is finished.

On the other hand, when the AF mode is determined to be the continuous AF mode in step 5, the image pickup section 2 is driven to photograph a still image using the second drive method (see FIG. 8, FIG. 9, FIG. 11, FIG. 12 or the like) (step S4) and this process is finished.

In the continuous AF mode, even after the release button is half-pressed, data for AF (also data for AE, if possible) can be preferably acquired until immediately before the exposure period starts. Since the image data for LV is used as data for AF or data for AE, in the continuous AF mode, the image pickup section 2 is driven using the second drive method. This causes the image photographed in the continuous AF mode to be an image photographed with high AF trackability and allows the image to be focused with high accuracy even when an object moving at high speed is photographed. On the other hand, in a single AF mode, since performing a normal AF operation (and normal AE operation) is sufficient, the image pickup section 2 is driven using the first drive method so as to shorten the time after the release button is pressed until recording to the memory card 6 is finished.

In the above described case, whether to drive the image pickup section 2 using the first drive method or the second drive method is selected depending on the photographing mode or AF mode, but the factor of selection is not limited to these methods and the drive method may also be selected according to other factors.

According to such Embodiment 1, when LV image data is read using the second drive method for at least one of the reset data reading period and the pixel data reading period, it is possible to shorten the period during which LV display is not displayed or not updated.

Furthermore, in the continuous shooting mode or continuous AF mode, LV image data is acquired using the second drive method, and therefore high AF tracking performance or high AE tracking performance can be secured. On the other hand, in the single shooting mode or single AF mode, the image pickup section 2 is driven using the first drive method, and therefore it is possible to shorten the time after the release button is pressed until recording to the memory card 6 is finished.

Moreover, for at least the period after the release button is pressed until reading of pixel data is finished, an image to be formed on the image pickup device is designed to never shake, and therefore even when an image of light from a high luminance object is formed as a high luminance portion, it is possible to prevent charge which is leaking into a light-shielded section from generating unnatural traces. This makes it possible to prevent deterioration of image quality and to acquire a natural image.

Embodiment 2

Figure 15:
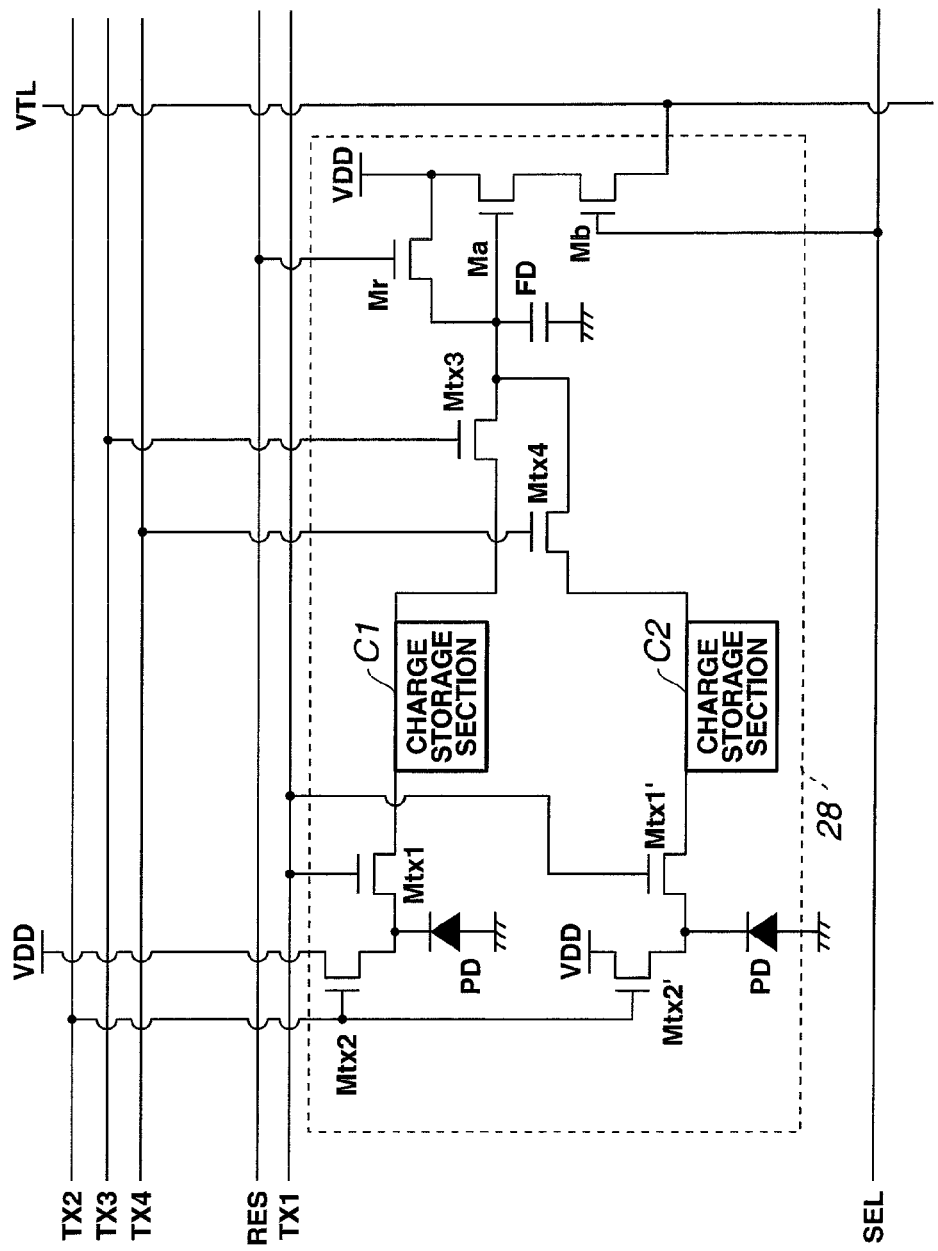
FIG. 15 is a circuit diagram illustrating an example of pixel configuration of a pixel section of an image pickup device according to Embodiment 2 of the present invention.
Figure 16:
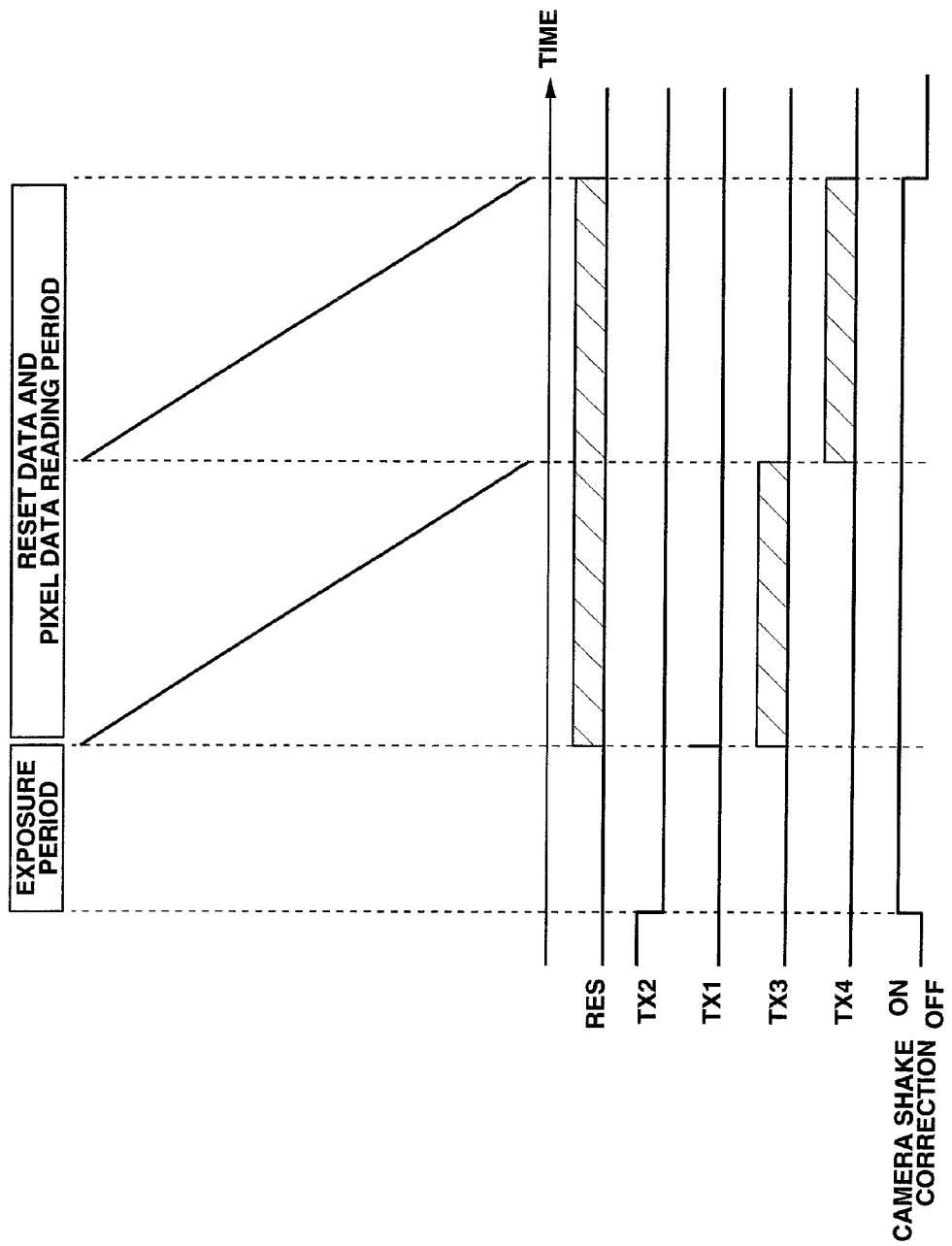
FIG. 16 is a timing chart illustrating operation when the image pickup section is driven to pick up a still image through a global shutter using the first drive method according to Embodiment 2 of the present invention.
Figure 17:
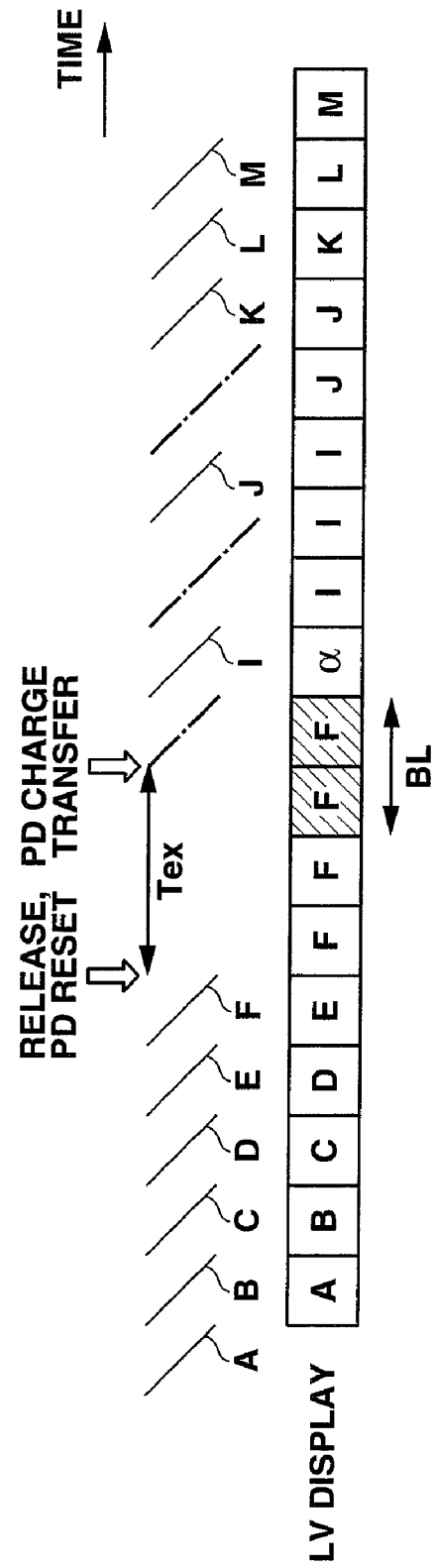
FIG. 17 is a diagram illustrating an example where the image pickup section is driven to pick up a still image using the second drive method in the middle of performing a live view according to Embodiment 2 of the present invention.

FIG. 15 to FIG. 17 illustrate Embodiment 2 of the present invention; FIG. 15 is a circuit diagram illustrating the pixel 28 in the pixel section 24 of the image pickup device 21, FIG. 16 is a timing chart illustrating operation when the image pickup section 2 is driven to pick up a still image through a global shutter using a first drive method and FIG. 17 is a diagram illustrating an example where the image pickup section 2 is driven to pick up a still image using a second drive method in the middle of performing a live view.

In Embodiment 2, parts similar to those in aforementioned Embodiment 1 are assigned the same reference numerals, explanations thereof will be omitted and only differences will be mainly explained.

First, the configuration of the pixel 28 of the present embodiment will be explained with reference to FIG. 15. In FIG. 15, the pixel 28 enclosed by a dotted line represents a pixel region corresponding to two pixels. That is, the image pickup device 21 shown in FIG. 15 adopts the illustrated configuration for every two vertically neighboring pixels.

A first photoelectric conversion section PD located in the upper part in the figure and a second photoelectric conversion section PD located in the lower part in the figure are connected to a signal line TX2 to apply a PD reset pulse via a transistor Mtx2 that functions as a first reset section and a transistor Mtx2' that functions as a first reset section, respectively. In the configuration shown in FIG. 15, the first photoelectric conversion section PD is reset by the transistor Mtx2 and the second photoelectric conversion section PD is reset by the transistor Mtx2'.

The first photoelectric conversion section PD is connected to a first charge storage section C1 (a specific example of the first charge storage section in the scope of claims) via a transistor Mtx1 that functions as a gate section. On the other hand, the second photoelectric conversion section PD is connected to a second charge storage section C2 (a specific example of the first charge storage section in the scope of claims) via a transistor Mtx1' that functions as a gate section. These transistor Mtx1 and transistor Mtx1' are connected to a signal line TX1 to apply a transfer pulse.

The first charge storage section C1 is connected to a signal storage section FD (a specific example of the second charge storage section in the scope of claims in the present embodiment) via a transistor Mtx3 that functions as a gate section. Here, the transistor Mtx3 is connected to a signal line TX3 to apply a transfer pulse. On the other hand, the second charge storage section C2 is connected to the signal storage section FD via a transistor Mtx4 that functions as a gate section. Here, the transistor Mtx4 is connected to a signal line TX4 to apply a transfer pulse.

The configuration of sections from this signal storage section FD onward is similar to that shown in FIG. 3.

Next, an image pickup operation using the first drive method will be explained with reference to FIG. 16. The image pickup device 21 having the pixel configuration shown in FIG. 15 is controlled so as to perform a first exposure during a global shutter operation first, and then read reset data and pixel data.

That is, when the release button of the camera operation section 11 is pressed, the image pickup device 21 simultaneously turns OFF the transistors Mtx2 and Mtx2' of all pixels on all lines via the signal line TX2, thereby starts storage of charge in the photoelectric conversion section PDs of all pixels, that is, simultaneously starts exposures of all pixels (start of the exposure period).

When a predetermined exposure period elapses after an exposure is started, transfer pulses are simultaneously applied to the transistors Mtx1 and Mtx1' of all pixels on all lines via the signal line TX1, the pixel charge stored in the photoelectric conversion sections PD is transferred to the first charge storage section C1 and the second charge storage section C2, that is, exposures of all pixels are simultaneously finished (end of the exposure period).

Next, a reset data and pixel data reading period starts.

That is, a reset pulse is applied from the signal line RES to the transistor Mr provided for common use by the first row and second row of the pixel section 24 to reset the signal storage section FD which is common to the first row and second row. Furthermore, a selection pulse is applied from the signal line SEL to the selection transistor Mb provided for common use by the first row and second row of the pixel section 24 and reset noise is thereby read from the signal storage section FD.

Immediately after that, a transfer pulse is applied to the transistor Mtx3 provided on the first row of the pixel section 24 via the signal line TX3 and the pixel charge stored in the first charge storage section C1 is transferred to the signal storage section FD. Furthermore, a selection pulse is applied from the signal line SEL to the selection transistor Mb provided for common use by the first row and second row of the pixel section 24 and pixel data from the signal storage section FD is thereby read.

The CDS section 25 performs processing of subtracting reset noise from the pixel data and outputs the pixel data to the horizontal scanning circuit 27. Therefore, when the pixel configuration as shown in FIG. 15 is adopted, the KTC noise elimination section 23 in FIG. 2 is not always necessary.

Such an operation is performed on odd-numbered rows of the pixel section 24 sequentially from the first row toward the nth row (final row) and pixel data on odd-numbered lines free of reset noise are thereby outputted.

Next, the same operation is performed on the even-numbered lines.

That is, a reset pulse is applied from the signal line RES to the transistor Mr provided commonly for the first row and second row of the pixel section 24 to reset the signal storage section FD which is common to the first row and second row. Furthermore, by applying a selection pulse from the signal line SEL to the selection transistor Mb provided commonly for the first row and second row of the pixel section 24, reset noise is read from the signal storage section FD.

Immediately after that, by applying a transfer pulse to the transistor Mtx4 provided on the second row of the pixel section 24 via the signal line TX4, pixel charge stored in the second charge storage section C2 is transferred to the signal storage section FD. Furthermore, by applying a selection pulse to the selection transistor Mb provided commonly for the first row and second row of the pixel section 24 from the signal line SEL, pixel data is read from the signal storage section FD.

The CDS section 25 then performs processing of subtracting reset noise from the pixel data and outputs the pixel data to the horizontal scanning circuit 27.

Such an operation is performed on even-numbered rows of the pixel section 24 sequentially from the second row toward the nth row (final row) and pixel data on even-numbered lines free of reset noise are thereby outputted.

At least from the start of an exposure period (reset start by the first reset section) to the end of a pixel data reading period, the camera shake correction section 8 performs a camera shake correction based on the detection result of the camera shake detection section 7.

In consideration of both present Embodiment 2 and aforementioned Embodiment 1, the camera control section 12 can be said to control at least a camera shake correction from the reset start by the first reset section (start of the exposure period) or the reset start by the second reset section (start of the reset data reading period), whichever comes first, until the end of the pixel data reading period.

Next, the processing of driving the image pickup section 2 to pick up a still image using the second drive method in the middle of performing a live view will be explained with reference to FIG. 17.

In the present embodiment, when the release button is pressed in the middle of performing a live view, an exposure period is started by resetting the photoelectric conversion sections PD of all pixels first and the exposure period is finished by simultaneously transferring charge of the photoelectric conversion sections PD of all pixels to the charge storage sections C1 and C2.

Next, as described above, a series of operations of reading reset data and reading pixel data is performed on LV lines first.

In the example shown in FIG. 17, image data α for a live view is created based on the pixel data read for a still image from an LV line and a live view is displayed in the immediately following display frame.

After that, LV image data is acquired at a rate of once every plurality of display frames (however, as described above, during the reset data and pixel data reading period, LV image data need not always be acquired in synchronization with the display frame).

Next, for a period during which no LV image data is acquired, reset data and pixel data of non-LV lines are read in a predetermined order (e.g., in ascending order of line numbers, odd-numbered lines first and even-numbered lines later, and so on).

When image pickup of the still image is completed, then a normal live view display is performed.

The present embodiment may also select whether to drive the image pickup section 2 using the first drive method as shown in FIG. 16 or drive the image pickup section 2 using the second drive method as shown in FIG. 17 depending on a photographing mode, AF mode or other factors, as with aforementioned Embodiment 1.

According to such Embodiment 2, it is possible to exert substantially the same effects as those in aforementioned Embodiment 1 with the image pickup device having the pixel configuration as shown in FIG. 15.

Embodiment 3

Figure 18:
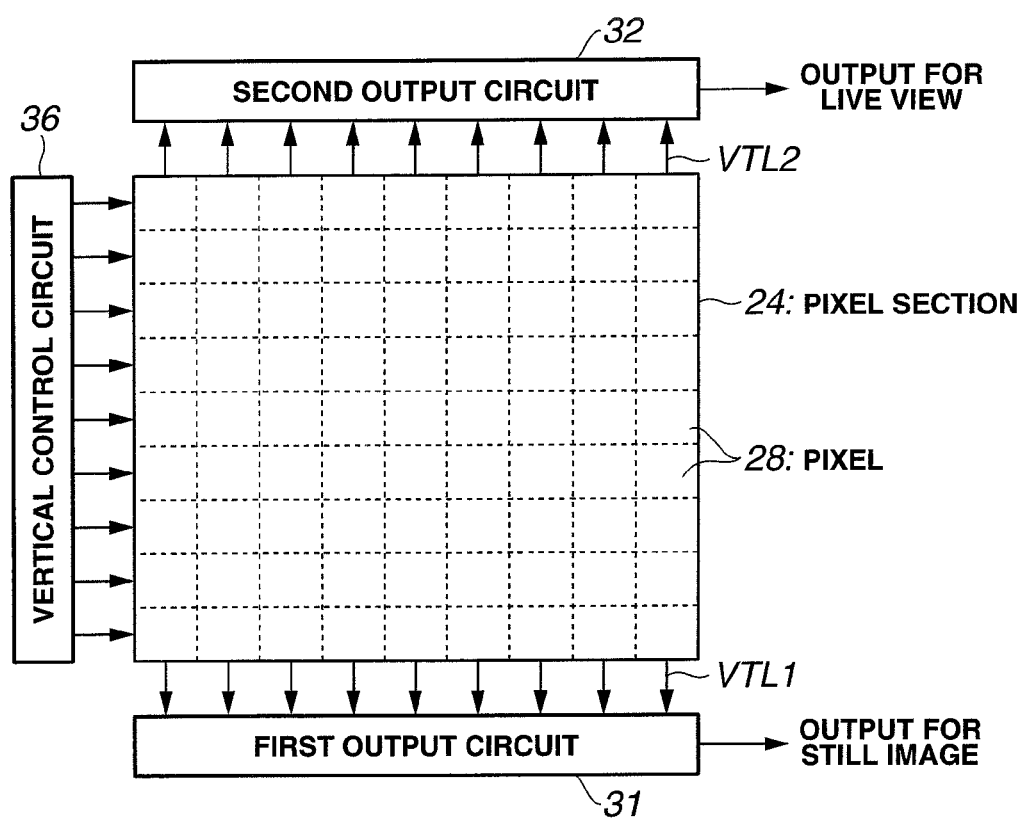
FIG. 18 is a diagram illustrating a configuration of an image pickup section according to Embodiment 3 of the present invention.
Figure 19:
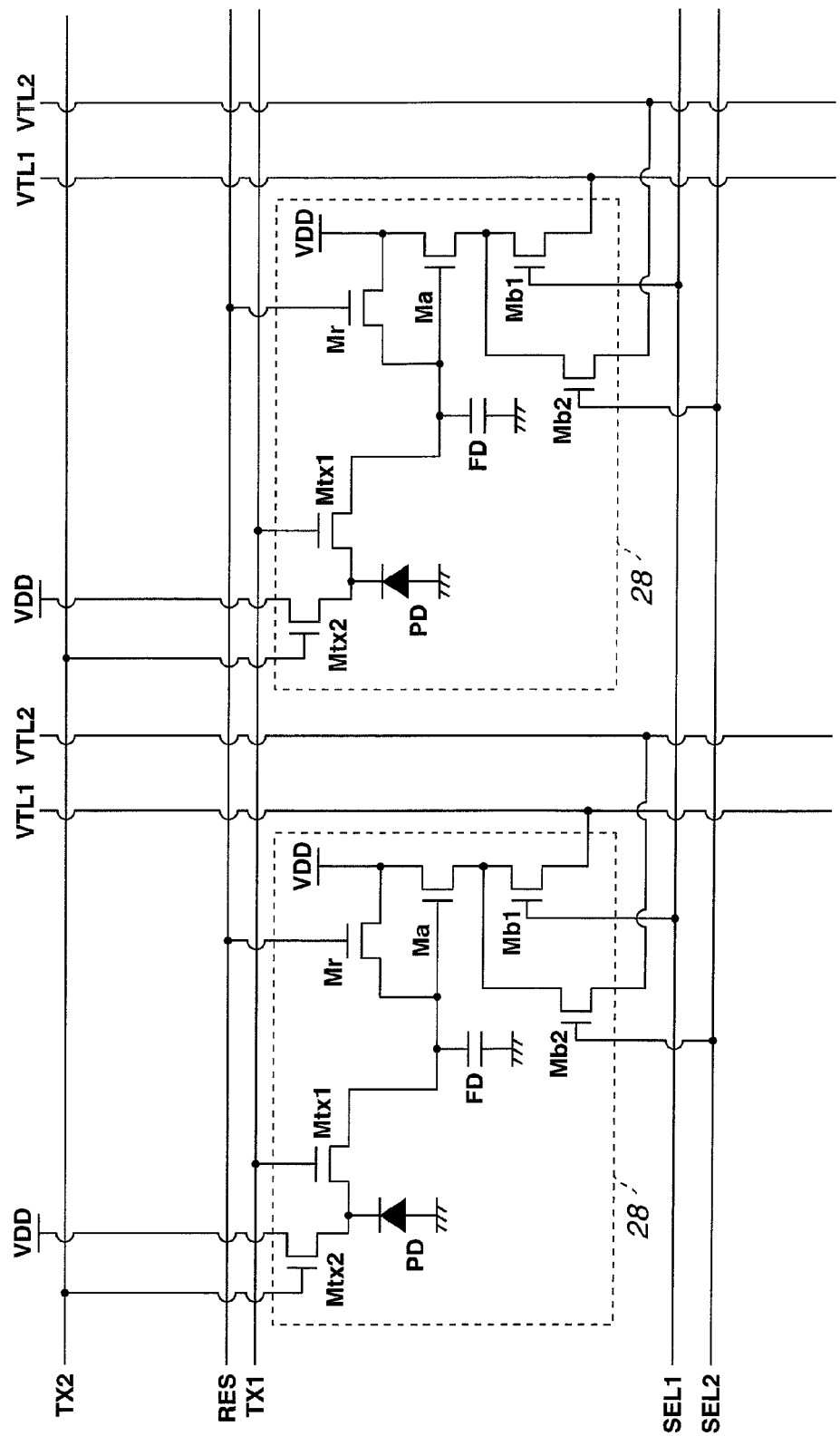
FIG. 19 is a circuit diagram illustrating an example of pixel configuration of the pixel section of the image pickup device according to Embodiment 3 of the present invention.
Figure 20:
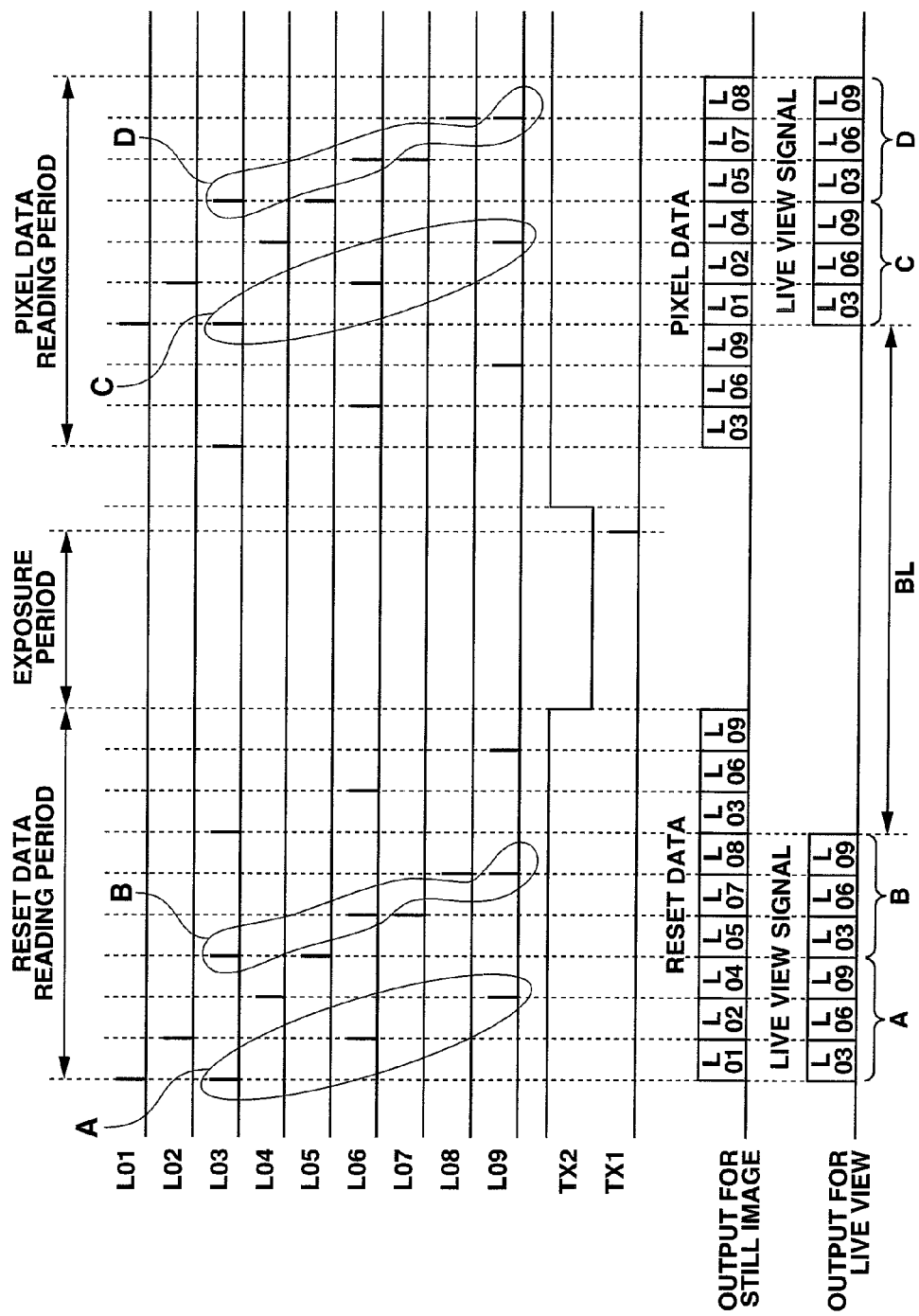
FIG. 20 is a timing chart illustrating an example of a first operation when the image pickup section is driven to pick up a still image through a global shutter using the second drive method according to Embodiment 3 of the present invention.
Figure 21:
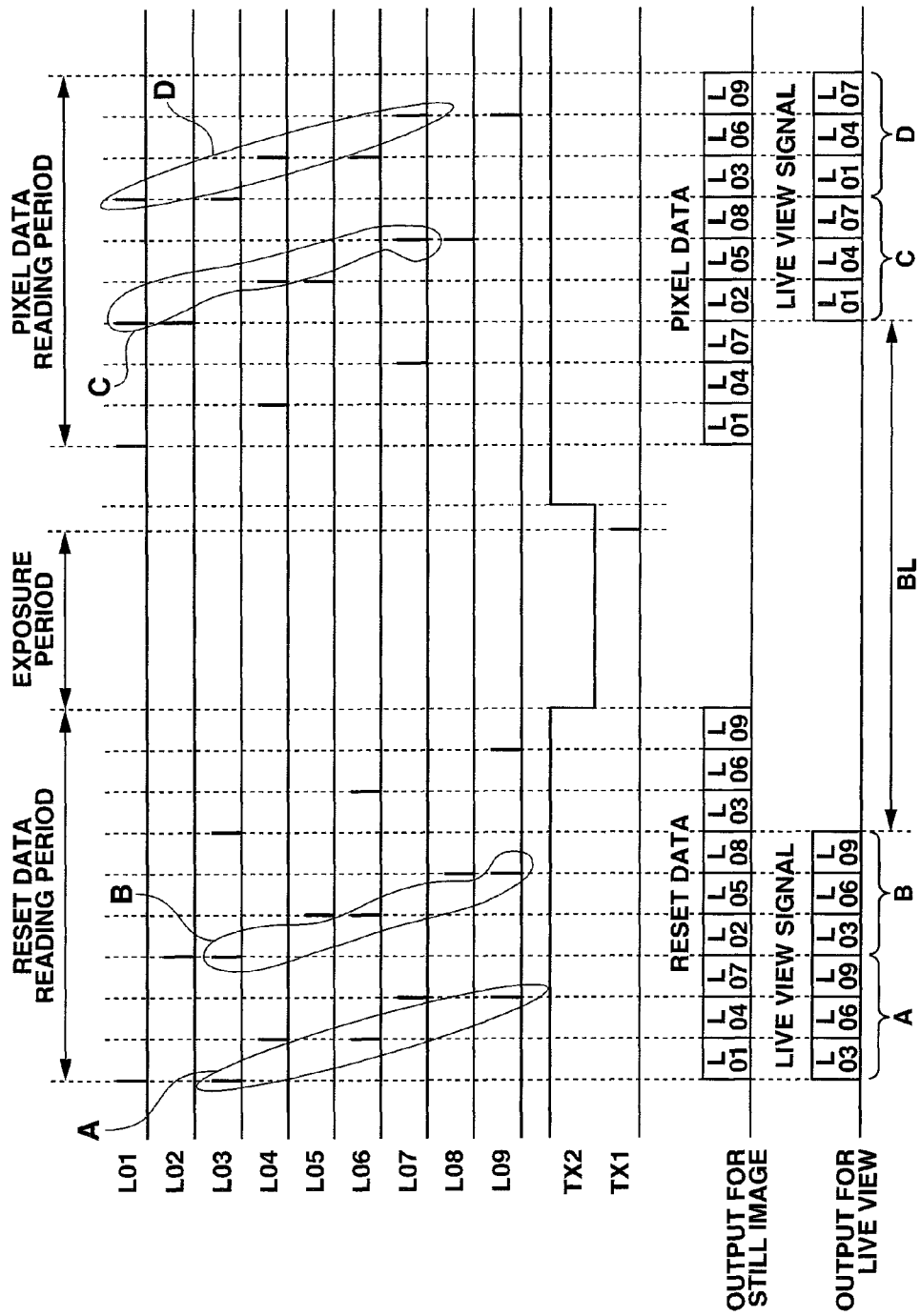
FIG. 21 is a timing chart illustrating an example of a second operation when the image pickup section is driven to pick up a still image through the global shutter using the second drive method according to Embodiment 3 of the present invention.

FIG. 18 to FIG. 21 illustrate Embodiment 3 of the present invention; FIG. 18 is a diagram illustrating a configuration of the image pickup section 2, FIG. 19 is a circuit diagram illustrating a pixel configuration example of the pixel 28 in the pixel section 24 of the image pickup device 21, FIG. 20 is a timing chart illustrating an example of a first operation when the image pickup section 2 is driven to pick up a still image through a global shutter using a second drive method and FIG. 21 is a timing chart illustrating an example of a second operation when the image pickup section 2 is driven to pick up a still image through the global shutter using the second drive method.

In Embodiment 3, parts similar to those in aforementioned Embodiments 1 and 2 are assigned the same reference numerals, explanations thereof will be omitted and only differences will be mainly explained.

The image pickup section 2 of the present embodiment is designed to be able to read pixel data and reset data from the pixel section 24 from two output circuits and is configured as a so-called multi-line reading image pickup section.

That is, signals are applied in row (line) units to the pixel section 24 in which a plurality of pixels 28 are two-dimensionally arrayed by a vertical control circuit 36 that has multi-functions as a vertical scanning circuit, a reset control section and a signal reading control section, and signals from pixels of a selected row are outputted to vertical transfer lines VTL1 or VTL2 provided for each column (also see FIG. 19), whichever is selected.

All vertical transfer lines VTL1 configured in the pixel section 24 are connected to a first output circuit 31. The first output circuit 31 includes, for example, the horizontal scanning circuit 27, the A/D conversion section 22 and the KTC noise elimination section 23 of the configuration shown in FIG. 2 (this does not, however, prevent the CDS section 25 from being included). A signal for a still image is designed to be outputted from the first output circuit 31.

All the vertical transfer lines VTL2 configured in the pixel section 24 are connected to a second output circuit 32. The second output circuit 32 includes, for example, the CDS section 25, the horizontal scanning circuit 27 and the A/D conversion section 22 of the configuration shown in FIG. 2 (this does not, however, prevent the KTC noise elimination section 23 from being included). A signal for a live view is designed to be outputted from the second output circuit 32.

Thus, the vertical control circuit 36 serves as both the live view data reading control section and the reset data/pixel data reading control section.

Next, a more detailed configuration of the pixel 28 will be explained with reference to FIG. 19.

First, as described above, the image pickup device 21 of the present embodiment is provided with the vertical transfer line VTL1 and the vertical transfer line VTL2 for each column.

In the pixel 28 shown in FIG. 19, the configuration of the photoelectric conversion section PD, the transistor Mtx2, transistor Mtx1, the signal storage section FD, the transistor Mr and the amplification transistor Ma is similar to that of the pixel 28 shown in FIG. 3.

However, the pixel 28 shown in FIG. 19 is provided with two transistors as signal charge reading sections connected to the amplification transistor Ma; a first selection transistor Mb1 (first signal charge reading section, reset signal reading section) and a second selection transistor Mb2 (second signal charge reading section, third signal charge reading section). The first selection transistor Mb1 is connected to the vertical transfer line VTL1 and is also connected to a signal line SEL1 to apply a first selection pulse. On the other hand, the second selection transistor Mb2 is connected to the vertical transfer line VTL2 and is also connected to a signal line SEL2 to apply a second selection pulse.

Therefore, charge stored in the signal storage section FD is outputted to the vertical transfer line VTL1 by applying a selection pulse to the signal line SEL1 or outputted to the vertical transfer line VTL2 by applying a selection pulse to the signal line SEL2. Outputting to the two different lines; outputting to the vertical transfer line VTL1 and outputting to the vertical transfer line VTL2 can be simultaneously performed.

Next, a first operation example when the image pickup section 2 is driven to pick up a still image through a global shutter using the second drive method will be explained with reference to FIG. 20. For simplicity, a case will be explained in FIG. 20 and next FIG. 21 assuming that the total number of horizontal lines provided in the pixel section 24 is 9 (arranged in order of lines L01 to L09 from the top end to the bottom end of the pixel section 24).

Moreover, in the example shown in FIG. 20, suppose LV lines are fixed to L03, L06 and L09. Therefore, non-LV lines are lines L01, L02, L04, L05, L07 and L08.

When a reset data reading period is started by the release button being pressed, the transistor Mr is turned ON for line L01 to reset the signal storage section FD first, and the first selection transistor Mb1 is turned ON to read reset data. At the same time, the transistor Mr is turned ON for line L03 to reset the signal storage section FD, the second selection transistor Mb2 is turned ON to read reset data, and the transistor Mtx1 is turned ON to transfer pixel data from the photoelectric conversion section PD to the signal storage section FD, and the second selection transistor Mb2 is turned ON to read pixel data.

Therefore, this operation causes still image reset data of line L01 as still image output and LV image data of line L03 as live view output to be outputted from the first output circuit 31 and the second output circuit 32 respectively. Here, reading of the LV image data from line L03 more specifically includes processing of reading reset data and pixel data consecutively and causing the CDS section 25 included in the second output circuit 32 to subtract the former from the latter.

Next, by performing similar processing, still image reset data is read from line L02 and LV image data is read from line L06.

Furthermore, likewise, still image reset data is read from line L04 (since line L03 is an LV line, reading thereof is not performed yet at this time) and LV image data is read from line L09.

In this way, LV image data A corresponding to one frame is outputted, and it is thereby possible for the display section 5 to perform a live view display in the next display frame.

Likewise, still image reset data is read from line L05 and LV image data is read from line L03, and still image reset data is read from line L07 and LV image data is read from line L06, still image reset data is read from line L08 and LV image data is read from line L09, and LV image data B corresponding to the next one frame is thereby outputted.

Since reading of still image reset data on non-LV lines is completed at this time, reading of still image reset data on LV lines is then started. Therefore, from this time onward, the live view display is not updated until the exposure period is finished and it is possible to acquire LV image data from the LV lines for the pixel data reading period or a period BL for blackout starts (however, the period BL shown in FIG. 20 is displayed on a time chart for live view output, but the actual LV display is performed in a display frame next to the frame in which LV image data is acquired, and therefore the actual LV display is shifted by approximately one display frame from the period BL on the display on the display section 5. The same will apply to the following explanations). That is, at the end of this reset data reading period, still image reset data is read from line L03, still image reset data is read from line L06 and still image reset data is read from line L09 in that order.

After that, exposures of all pixels are simultaneously started by simultaneously turning OFF the transistors Mtx2 of all pixels on all lines via the signal line TX2.

After a lapse of a predetermined exposure period, a transfer pulse is simultaneously applied to the transistors Mtx1 of all pixels on all lines via the signal line TX1, pixel charge is thereby transferred to the signal storage sections FD and exposures of all pixels are simultaneously finished.

Next, a pixel data reading period starts.

To enable LV image data to be acquired from the LV lines at the soonest possible time, reading of still image pixel data on the LV lines is started first. That is, at the beginning of this pixel data reading period, still image pixel data is read from line L03, still image pixel data is read from line L06, and still image pixel data is read from line L09 in that order. Therefore, upon completion of this reading, the period BL ends and LV image data can be acquired from this time on.

Since the present embodiment assumes that images for a still image and images for a live view have different output systems, in the flow shown in FIG. 20, image data α for a live view is not created based on the still image pixel data read from the LV line at the beginning of the pixel data reading period, but a live view may be displayed from a time one display frame earlier after creating the image data α.

Next, still image pixel data is read from line L01, LV image data is read from line L03, still image pixel data is read from line L02 and LV image data is read from line L06 and still image pixel data is read from line L04 and LV image data is read from line L09, and LV image data C corresponding to one frame is thereby outputted.

Likewise, still image pixel data is read from line L05, LV image data is read from line L03, still image pixel data is read from line L07 and LV image data is read from line L06, still image pixel data is read from line L08 and LV image data is read from line L09, and LV image data D corresponding to the next one frame is thereby outputted.

Since reading of still image pixel data on all lines is completed at this time, image pickup of a still image is completed and a normal live view display will be performed from this time on.

Next, a second operation example where the image pickup section 2 is driven to pick up a still image through a global shutter using the second drive method will be explained with reference to FIG. 21.

As explained in aforementioned Embodiment 1 with reference to FIG. 11 and FIG. 12, when the time after reading of reset data until reading of pixel data varies from one line to another, the amount of noise resulting from a dark current varies from one line to another. This also corresponds to the flow of processing shown in FIG. 20 likewise. Therefore, it is a flow of processing shown in FIG. 21 that results from changing the flow of processing shown in FIG. 20 so that the amount of noise on each line becomes basically constant.

That is, in the example shown in FIG. 21, unlike the example shown in FIG. 20, LV lines (lines L03, L06, L09) for which LV image data is acquired before an exposure period and LV lines (lines L01, L04, L07) for which LV image data is acquired after the exposure period are made to differ from each other so as not to overlap with each other. Here, the LV lines before the exposure period and the LV lines after the exposure period are lines selected at certain line intervals so as to cover the entire surface of the pixel section 24 as uniformly as possible.

When the reset data reading period is started through pressing of the release button, reset data of the LV lines after the exposure period are read first. That is, the still image reset data is read from line L01 and LV image data is read from line L03, and still image reset data is read from line L04, LV image data is read from line L06, and still image reset data is read from line L07 and LV image data is read from line L09, and reset data of LV lines after the exposure period is thereby outputted and LV image data A corresponding to one frame is outputted.

Next, still image reset data is read from line L02, LV image data is read from line L03, still image reset data is read from line L05, LV image data is read from line L06, and still image reset data is read from line L08, LV image data is read from line L09, and reset data and LV image data B corresponding to the next one frame are thereby outputted.

At the end of the reset data reading period, still image reset data is read from line L03, still image reset data is read from line L06 and still image reset data is read from line L09.

The processing for the next exposure period is similar to the processing shown in FIG. 20.

When the exposure period ends, next, a pixel data reading period starts.

First, still image pixel data on the LV lines (lines L01, L04, L07) after the exposure period for which reset data have been read first for the reset data reading period are sequentially read. From this time on, LV image data can be acquired from the LV lines after the exposure period.

In the flow shown in FIG. 21, image data α for a live view may also be created based on the still image pixel data read from the LV lines at the beginning of the pixel data reading period and a live view may be displayed from a time one display frame earlier.

Next, still image pixel data is read from line L02, LV image data is read from line L01, still image pixel data is read from line L05, LV image data is read from line L04, still image pixel data is read from line L08, LV image data is read from line L07, and LV image data C corresponding to one frame is thereby outputted.

Likewise, still image pixel data is read from line L03, LV image data is read from line L01, still image pixel data is read from line L06, LV image data is read from line L04, still image pixel data is read from line L09, LV image data is read from line L07, and LV image data D corresponding to next one frame is thereby outputted.

At this time, reading of still image pixel data of all lines is completed, and therefore image pickup of the still image is completed and a normal live view display will be performed from this time on.

As is obvious from FIG. 21, the processing as shown in FIG. 21 can be regarded as dividing the pixel section 24 into a plurality of fields (line groups or pixel groups) to perform reading and using, for example, one of the plurality of fields for LV reading. That is, for the reset data reading period before the exposure, when reset data of another field is read, the last read field is used to read LV pixel data. Furthermore, for the pixel data reading period after the exposure, when the pixel data of another field is read, the first read field is used to read the LV pixel data.

Performing the processing as shown in FIG. 21 can prevent deterioration of image quality caused by the amount of noise varying depending on lines.

The present embodiment reads images for a still image from one of multi-line reading output systems and reads images for a live view from another output system, and therefore when a line is different, simultaneous reading is possible, and the reset data reading period and the pixel data reading period never become longer than those of the first drive method of Embodiment 1. Therefore, there is no compelling necessity to select the first drive method or the second drive method depending on the photographing mode or AF mode.

However, when the first output circuit 31 and the second output circuit 32 have the same configuration (that is, when the CDS section 25 is included in the first output circuit 31 and the KTC noise elimination section 23 is included in the second output circuit 32 as described above), it is possible to perform both outputting for a live view from the first output circuit 31 and outputting for still images from the second output circuit 32. Therefore, when outputting for still images using the first drive method in the present embodiment is performed, it is possible to read two lines from the first output circuit 31 and the second output circuit 32 and thereby enhance the reading speed. Therefore, when two-line reading using the first drive method is adopted, it is effective to select the first drive method or second drive method depending on the photographing mode or AF mode.

A case with two-line reading has been described above as an example of multi-line reading, but multi-line reading can naturally be three or more line reading.

According to such Embodiment 3, the configuration provided with an image pickup section based on a multi-line reading scheme can exert substantially the same effects as those of aforementioned Embodiment 1. Moreover, adopting multi-line reading can also shorten the reading period (reset data reading period and/or pixel data reading period) compared to Embodiment 1. Unlike Embodiment 1, LV image data can be acquired during a reset data reading period and pixel data reading period at a rate of once every one display frame.

Embodiment 4

Figure 22:
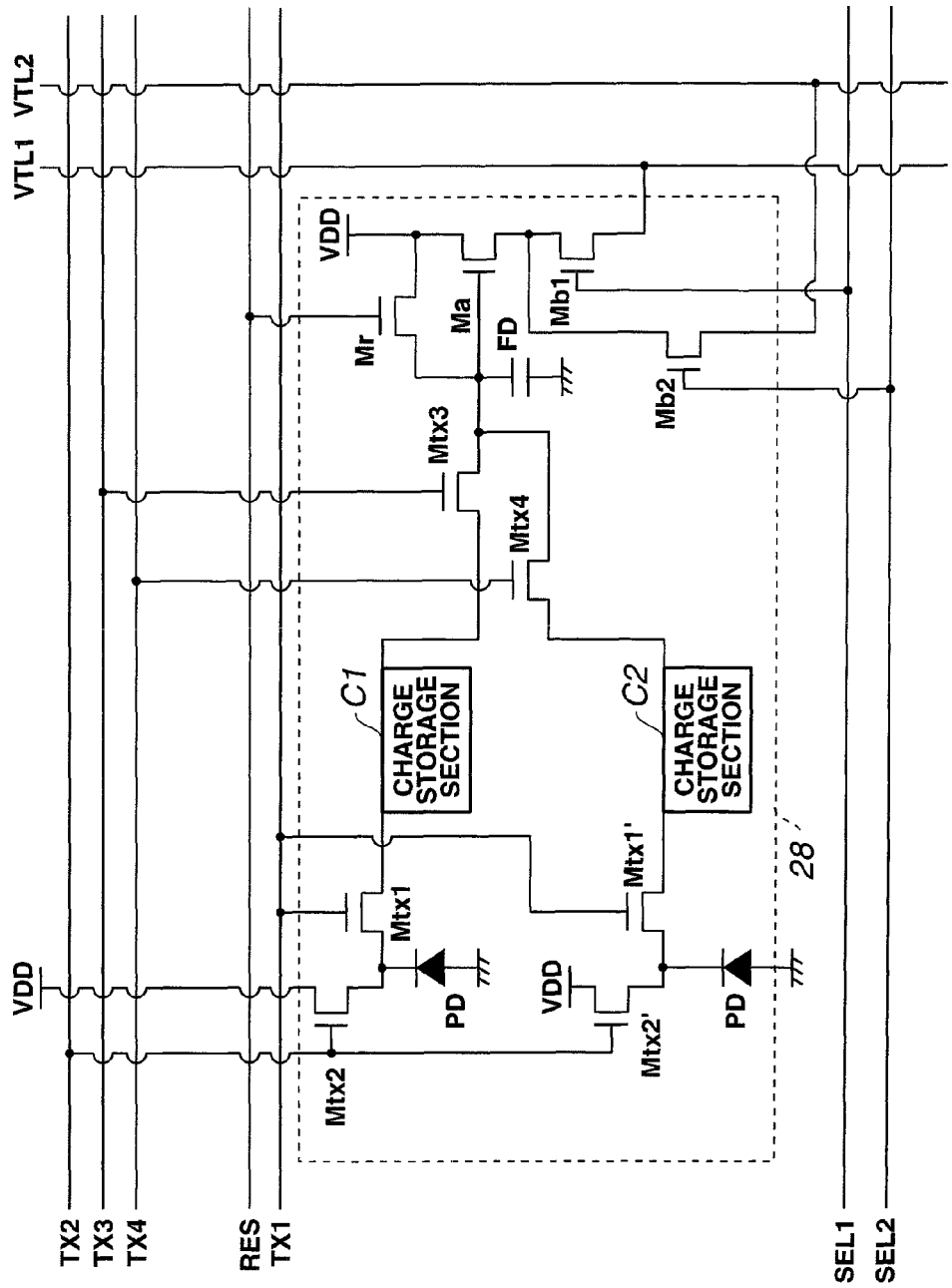
FIG. 22 is a circuit diagram illustrating an example of pixel configuration in a pixel section of an image pickup device according to Embodiment 4 of the present invention.
Figure 23:
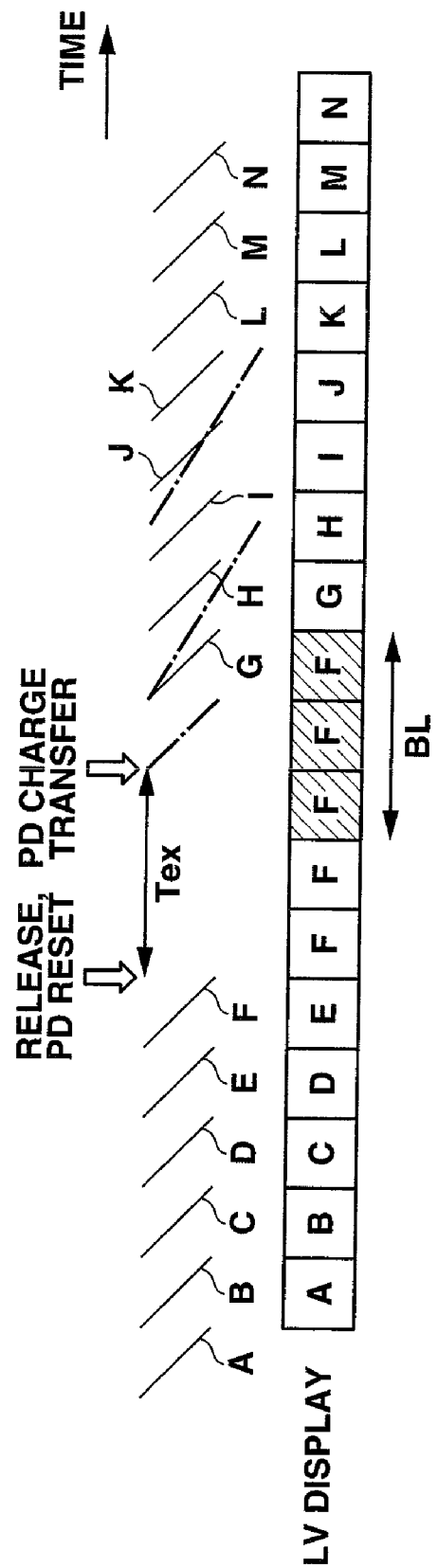
FIG. 23 is a diagram illustrating an example where the image pickup section is driven to pick up a still image using the second drive method in the middle of performing a live view according to Embodiment 4 of the present invention.

FIG. 22 and FIG. 23 illustrate Embodiment 4 of the present invention; FIG. 22 is a circuit diagram illustrating a configuration example of the pixel 28 in the pixel section 24 of the image pickup device 21 and FIG. 23 is a diagram illustrating an example where the image pickup section 2 is driven to pick up a still image using a second drive method in the middle of performing a live view.

In Embodiment 4, parts similar to those in aforementioned Embodiments 1 to 3 are assigned the same reference numerals, explanations thereof will be omitted and only differences will be mainly explained.

First, the configuration of the pixel 28 will be explained with reference to FIG. 22. The pixel 28 of the present embodiment corresponds to the pixel 28 shown in Embodiment 2 modified for multi-line reading (to be more specific, two-line reading). Therefore, the configuration of the image pickup section 2 is similar to that shown in FIG. 18 of aforementioned Embodiment 3. Furthermore, in FIG. 22, the pixel 28 enclosed by a dotted line also represents a pixel region corresponding to two pixels.

First, as described above, the image pickup device 21 of the present embodiment is provided with the vertical transfer line VTL1 and the vertical transfer line VTL2 for each column.

In the pixel 28 shown in FIG. 22, the configuration of the photoelectric conversion section PD, the transistors Mtx2 and Mtx2', the transistors Mtx1 and Mtx1', the charge storage sections C1 and C2, the transistors Mtx3 and Mtx4, the signal storage section FD, the transistor Mr and the amplification transistor Ma are similar to those of the pixel 28 shown in FIG. 15.

However, the pixel 28 shown in FIG. 22 is provided with two transistors as the signal charge reading section connected to the amplification transistor Ma; a first selection transistor Mb1 and a second selection transistor Mb2. The first selection transistor Mb1 is connected to the vertical transfer line VTL1 and also connected to the signal line SEL1 to apply a first selection pulse. Furthermore, the second selection transistor Mb2 is connected to the vertical transfer line VTL2 and is also connected to the signal line SEL2 to apply a second selection pulse.

Therefore, charge stored in the signal storage section FD is outputted to the vertical transfer line VTL1 by applying a selection pulse to the signal line SEL1 and outputted to the vertical transfer line VTL2 by applying a selection pulse to the signal line SEL2. As shown in FIG. 22, when consecutive two lines provided with a common signal storage section FD are assumed to be one reading group (line m and line (m+1) constitute one reading group when m is assumed to be an integer, and more specifically, lines 1 and 2 constitute a first reading group, and lines 3 and 4 constitute a second reading group, ... and so on), outputting to the vertical transfer line VTL1 and outputting to the vertical transfer line VTL2 can be simultaneously performed for two lines of different reading groups.

Next, processing when the image pickup section 2 is driven to pick up a still image using the second drive method in the middle of performing a live view will be explained with reference to FIG. 23.

When the release button is pressed in the middle of performing a live view, an exposure period is started by resetting the photoelectric conversion sections PD of all pixels and the exposure period is finished by collectively transferring charge in the photoelectric conversion sections PD of all pixels to the charge storage sections C1 and C2.

Next, LV lines are subjected to consecutive reading of reset data and pixel data first.

After that, consecutive reading of reset data and pixel data from the LV lines and consecutive reading of reset data and pixel data from the non-LV lines are performed simultaneously or in parallel.

In this case, pixel data of even a certain LV line and a non-LV line of the same reading group can be read simultaneously or in parallel while LV pixel data is being read from another LV line. Explaining more specifically with reference to FIG. 6 of aforementioned Embodiment 1, while LV pixel data is being read from LV line 6 of the third reading group made up of lines 5 and 6, it is possible to read pixel data for a still image from non-LV line 12 of the sixth reading group made up of lines 11 and 12 simultaneously or in parallel.

As with aforementioned Embodiment 3, since the present embodiment assumes that images for a still image and images for a live view have different output systems, in the flow shown in FIG. 23, image data α for a live view is not created based on still image pixel data read from LV lines at the beginning of the pixel data reading period. However, a live view may naturally be displayed from a time one display frame earlier after creating image data α.

When image pickup of the still image is completed, a normal live view will be displayed thereafter.

As with the aforementioned embodiments, the present embodiment may also select whether to drive the image pickup section 2 using the first drive method or drive the image pickup section 2 using the second drive method depending on a photographing mode or AF mode or other factors.

Furthermore, the present embodiment also adopts two-line reading as an example of multi-line reading, but multi-line reading with three or more lines may also naturally be adopted.

Thus, Embodiment 4 can exert substantially the same effects as those in aforementioned Embodiment 2 by adopting the configuration provided with an image pickup section based on a multi-line reading scheme. Furthermore, since multi-line reading is adopted, it is also possible to shorten the reading period (reset data and pixel data reading period) compared to Embodiment 2. Unlike Embodiment 2, it is possible to acquire LV image data during reset data and the pixel data reading period at a rate of once every one display frame.

An image pickup apparatus has been mainly explained in the aforementioned embodiments, but the present invention is not limited to an image pickup apparatus, and may also be applicable, for example, to a method of picking up a live view image and still image using an image pickup apparatus as described above, that is, an image pickup method for an image pickup apparatus, or an image pickup processing program for an image pickup apparatus or a recording medium that records an image pickup processing program for an image pickup apparatus or the like.

Having described the preferred embodiments of the invention referring to the accompanying drawings, it should be understood that the present invention is not limited to those precise embodiments and various changes and modifications there of could be made by one skilled in the art without departing from the spirit or scope of the invention as defined in the appended claims.

What is claimed is:

1. An image pickup apparatus comprising:
    a pixel section in which pixels, each including a photoelectric conversion section for generating signal charge according to an exposure amount, are two-dimensionally arrayed;
    a reset section that simultaneously resets the photoelectric conversion sections of all the pixels;
    an exposure control section that controls the photoelectric conversion sections so as to perform exposure for a predetermined time after reset by the reset section;
    a first charge storage section that is light-shielded and that simultaneously transfers and stores signal charge of all the pixels generated by the photoelectric conversion sections;
    a first signal charge reading section that reads signal charge of a predetermined pixel group out of the signal charge of all the pixels stored in the first charge storage section before signal charge of other pixel groups and then reads signal charge of the other pixel groups;
    a first image processing section that creates first image data for still image recording based on the signal charge read by the first signal charge reading section;
    a second signal charge reading section that reads signal charge generated by newly performing exposure by the predetermined pixel group one or more times within a time segment within which the first signal charge reading section reads signal charge of the other pixel groups;
    a second image processing section that creates second image data for image display based on the signal charge read by the second signal charge reading section; and
    a camera control section for controlling whether to acquire the first image data for still image recording by a single shooting or continuous shootings, wherein when the first image data is acquired by a single shooting, operations of the second signal charge reading section and the second image processing section are not performed, whereas when the first image data is acquired by continuous shootings, operations of the second signal charge reading section and the second image processing section are performed.

2. The image pickup apparatus according to claim 1, wherein each of the pixels comprises:
    the photoelectric conversion section;
    a first transistor that functions as the reset section;
    a second transistor for transferring charge generated by the photoelectric conversion section to the first charge storage section;
    a second charge storage section that is light-shielded and transfers and stores the charge stored in the first charge storage section;
    a third transistor for transferring the charge stored in the first charge storage section to the second charge storage section;
    a fourth transistor for resetting the second charge storage section;
    a fifth transistor for amplifying a voltage of the second charge storage section; and
    a sixth transistor for selecting an output signal of the fifth transistor, the image pickup apparatus further comprises a reset signal reading section that reads a voltage of the second charge storage section when the fourth transistor resets the second charge storage section as a reset signal after performing exposure on the photoelectric conversion sections, and the first image processing section creates the first image data based on a difference between signal charge read by the first signal charge reading section and a reset signal read by the reset signal reading section.

3. The image pickup apparatus according to claim 2, further comprising a camera shake correction section that reduces camera shake of an optical image exposed onto the pixel section at least after collective resetting of the photoelectric conversion sections by the first transistor until an end of reading of signal charge by the first signal charge reading section.

4. The image pickup apparatus according to claim 1, wherein each of the pixels comprises:
    the photoelectric conversion section;
    a first transistor that functions as the reset section;

a second transistor for transferring charge generated by the photoelectric conversion section to the first charge storage section;

a third transistor for resetting the first charge storage section;

a fourth transistor for amplifying a voltage of the first charge storage section; and a fifth transistor for selecting an output signal of the fourth transistor, the image pickup apparatus further comprises a reset signal reading section that reads a voltage of the first charge storage section when the third transistor resets the first charge storage section as a, reset signal before performing exposure on the photoelectric conversion section, and the first, image processing section creates the first image data based on a difference between signal charge read by the first signal charge reading section and a reset signal read by the reset signal reading section.

5. The image pickup apparatus according to claim 4, further comprising a camera shake correction section that reduces camera shake of an optical image exposed onto the pixel section at least after a start of resetting of the first charge storage section by the third transistor until an end of reading of signal charge by the first signal charge reading section.

6. An image pickup apparatus comprising:
a pixel section in which pixels, each including a photoelectric conversion section for generating signal charge according to an exposure amount, are two-dimensionally arrayed;

a reset section that simultaneously resets the photoelectric conversion sections of all the pixels;

an exposure control section that controls the photoelectric conversion sections so as to perform exposure for a predetermined time after reset by the reset section;

a first charge storage section that is light-shielded and that simultaneously transfers and stores signal charge of all the pixels generated by the photoelectric conversion sections;

a first signal charge reading section that reads signal charge of a predetermined pixel group out of the signal charge of all the pixels stored in the first charge storage section before signal charge of other pixel groups and then reads signal charge of the other pixel groups;

a first image processing section that creates first image data for still image recording based on the signal charge read by the first signal charge reading section;

a second signal charge reading section that reads signal charge generated by newly performing exposure by the predetermined pixel group one or more times within a time segment within which the first signal charge reading section reads signal charge of the other pixel groups;

a second image processing section that creates second image data for image display based on the signal charge read by the second signal charge reading section;

a photographing lens;

an AF control section that auto-focus controls the photographing lens; and a camera control section for controlling, when the first image data for still image recording is acquired, the AF control section by any one of single AF and continuous AF, wherein when control is performed by single AF, operations of the second signal charge reading section and the second image processing section are not performed, whereas when control is performed by continuous AF, operations of the second signal charge reading section and the second image processing section are performed.

7. An image pickup method of collectively resetting photoelectric conversion sections of all the pixels included in a two-dimensional array of pixels, then simultaneously transferring signal charge of all the pixels generated by performing exposure for a predetermined time and storing the signal charge in a storage section and reading the signal charge stored in the storage section, the method comprising:
a step of causing a reset section to simultaneously reset the photoelectric conversion sections of all the pixels;

a step of causing an exposure control section to control the photoelectric conversion sections so as to perform exposure for a predetermined time after reset by the reset section;

a step of causing a first charge storage section that is light-shielded, to simultaneously transfer and store the signal charge of all the pixels generated by the photoelectric conversion sections;

a step of causing a first signal charge reading section to read signal charge of a predetermined pixel group of the signal charge of all the pixels stored in the first charge storage section before signal charge of other pixel groups and to then read signal charge of the other pixel groups;

a step of causing a first image processing section to create first image data for still image recording based on the signal charge read by the first signal charge reading section;

a step of causing a second signal charge reading section to read signal charge generated by newly performing exposure by the predetermined pixel group one or more times within a time segment during which the first signal charge reading section reads signal charge of the other pixel groups;

a step of causing a second image processing section to create second image data for image display based on the signal charge read by the second signal charge reading section; and a step of causing a camera control section to control whether to acquire the first image data for still image recording by a single shooting or continuous shootings, wherein when the first image data is acquired by a single shooting, operations of the second signal charge reading section and the second image processing section are not performed, whereas when the first image data is acquired by continuous shootings, operations of the second signal charge reading section and the second image processing section are performed.

* * * * *